(12) United States Patent
Merget et al.

(10) Patent No.: US 11,705,721 B2
(45) Date of Patent: Jul. 18, 2023

(54) KICKBACK CONTROL METHODS FOR A POWER TOOL INCLUDING A FORCE SENSOR

(71) Applicant: MILWAUKEE ELECTRIC TOOL CORPORATION, Brookfield, WI (US)

(72) Inventors: Maxwell L. Merget, Milwaukee, WI (US); Jessie L. Bernitt, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 184 days.

(21) Appl. No.: 17/194,722

(22) Filed: Mar. 8, 2021

(65) Prior Publication Data
US 2021/0283759 A1 Sep. 16, 2021

Related U.S. Application Data

(60) Provisional application No. 62/987,515, filed on Mar. 10, 2020.

(51) Int. Cl.
*H02H 7/26* (2006.01)
*H02K 11/215* (2016.01)
*H02K 7/00* (2006.01)
*H02K 7/14* (2006.01)
*H02H 1/00* (2006.01)
(Continued)

(52) U.S. Cl.
CPC ............ *H02H 7/26* (2013.01); *B25F 5/001* (2013.01); *H02H 1/0007* (2013.01);
(Continued)

(58) Field of Classification Search
CPC ....... H02K 7/145; H02K 11/215; H02K 7/003
(Continued)

(56) References Cited

U.S. PATENT DOCUMENTS

| 1,122,380 A | 12/1914 | Forster |
| 2,020,637 A | 11/1932 | Fawick |

(Continued)

FOREIGN PATENT DOCUMENTS

| CN | 201735835 U | 2/2011 |
| CN | 102233448 A | 11/2011 |

(Continued)

OTHER PUBLICATIONS

International Search Report and Written Opinion for Application No. PCT/US2021/021320 dated Jun. 24, 2021 (11 pages).

*Primary Examiner* — Jose A Gonzalez Quinones
(74) *Attorney, Agent, or Firm* — Michael Best & Friedrich LLP

(57) ABSTRACT

A power tool including a housing, a motor having a rotor and a stator, at least one grip sensor configured to generate a grip parameter, and a switching network electrically coupled to the brushless DC motor. An electronic processor is connected to the switching network and the at least one grip sensor and configured to implement kickback control of the power tool. The electronic processor is configured to determine a kickback threshold based on the grip parameter, control the switching network to drive the motor, receive a signal related to a power tool characteristic, determine, based on the power tool characteristic being greater than or equal to the kickback threshold, that a kickback event of the power tool is occurring, and control, in response to determining that the kickback event is occurring, the switching network to cease driving of the motor.

20 Claims, 19 Drawing Sheets

(51) Int. Cl.
  *B25F 5/00*   (2006.01)
  *H02J 13/00*  (2006.01)
  *B25D 17/24*  (2006.01)

(52) U.S. Cl.
  CPC ............. *H02K 7/003* (2013.01); *H02K 7/145* (2013.01); *H02K 11/215* (2016.01); *B25D 17/24* (2013.01); *B25D 2250/095* (2013.01); *H02J 13/00002* (2020.01)

(58) Field of Classification Search
  USPC ...................................... 310/50, 75 B, 68 B
  See application file for complete search history.

(56) References Cited

U.S. PATENT DOCUMENTS

| | | |
|---|---|---|
| 2,668,917 A | 9/1952 | Uher |
| 2,966,977 A | 10/1957 | Johnson |
| 3,390,749 A | 7/1968 | Pospisil et al. |
| 3,923,126 A | 12/1975 | Bidanset |
| 4,066,133 A | 1/1978 | Voss |
| 4,152,833 A | 5/1979 | Phillips |
| 4,249,117 A | 2/1981 | Leukhardt et al. |
| 4,317,176 A | 2/1982 | Saar et al. |
| 4,385,442 A | 5/1983 | Nitschmann et al. |
| 4,410,846 A | 10/1983 | Gerber et al. |
| 4,448,261 A | 5/1984 | Kousek et al. |
| 4,553,326 A | 11/1985 | West |
| 4,638,870 A | 1/1987 | Kousek |
| 4,662,492 A | 5/1987 | Froeder |
| 4,773,518 A | 9/1988 | Raad et al. |
| 4,793,453 A | 12/1988 | Nishimura |
| 5,076,120 A | 12/1991 | Lin |
| 5,125,160 A | 6/1992 | Gassen |
| 5,401,124 A | 3/1995 | Hettich |
| 5,584,619 A | 12/1996 | Guzzella |
| 5,704,435 A | 1/1998 | Meyer et al. |
| 5,879,111 A | 3/1999 | Stöck et al. |
| 5,914,882 A | 6/1999 | Yeghiazarians |
| 5,954,457 A | 9/1999 | Stöck et al. |
| 5,996,707 A | 12/1999 | Thome et al. |
| 6,111,515 A | 8/2000 | Schaer et al. |
| 6,415,875 B1 | 7/2002 | Meixner et al. |
| 6,644,450 B2 | 11/2003 | Kristen et al. |
| 6,705,410 B2 | 3/2004 | Ziegler |
| 6,842,987 B1 | 1/2005 | Martinsson et al. |
| 6,843,140 B2 | 1/2005 | Osselmann et al. |
| 6,863,165 B2 | 3/2005 | Koslowski |
| 6,981,557 B2 | 1/2006 | Boeni et al. |
| 7,011,165 B2 | 3/2006 | Kristen et al. |
| 7,055,620 B2 | 6/2006 | Nadig et al. |
| 7,306,046 B2 | 12/2007 | Meixner et al. |
| 7,372,226 B2 | 5/2008 | Wiker et al. |
| 7,410,006 B2 | 8/2008 | Zhang et al. |
| 7,438,169 B2 | 10/2008 | Swanson et al. |
| 7,506,694 B2 | 3/2009 | Stirm et al. |
| 7,552,781 B2 | 6/2009 | Zhang et al. |
| 7,628,219 B2 | 12/2009 | Frauhammer et al. |
| 7,699,118 B2 | 4/2010 | Stetter et al. |
| 7,861,659 B2 | 1/2011 | Gillis et al. |
| 8,235,139 B2 | 8/2012 | Chen et al. |
| RE44,311 E | 6/2013 | Zhang et al. |
| 8,555,997 B2 | 10/2013 | Carrier et al. |
| 8,579,041 B2 | 11/2013 | Pellenc |
| 8,727,941 B2 | 5/2014 | Aoki |
| RE44,993 E | 7/2014 | Vanko et al. |
| RE45,112 E | 9/2014 | Zhang et al. |
| 8,833,484 B2 | 9/2014 | Binder et al. |
| 9,038,743 B2 | 5/2015 | Aoki |
| 9,144,875 B2 | 9/2015 | Schlesak et al. |
| 9,339,923 B2 | 5/2016 | Aoki |
| 9,352,456 B2 | 5/2016 | Murthy et al. |
| 9,364,944 B2 | 6/2016 | Aoki |
| 9,505,097 B2 | 11/2016 | Aoki et al. |
| 9,533,406 B2 | 1/2017 | Aoki |
| 9,815,182 B2 | 11/2017 | Ikuta |
| 9,962,807 B2 | 5/2018 | Klee et al. |
| 10,144,122 B2 | 12/2018 | Steurer |
| 2004/0011632 A1 | 1/2004 | Hellmann et al. |
| 2004/0181951 A1 | 9/2004 | Wittke |
| 2008/0021590 A1 | 1/2008 | Vanko et al. |
| 2008/0110653 A1 | 5/2008 | Zhang et al. |
| 2009/0065225 A1 | 3/2009 | Foster et al. |
| 2009/0138116 A1 | 5/2009 | Austin et al. |
| 2010/0263591 A1 | 10/2010 | Nielsen et al. |
| 2010/0307782 A1 | 12/2010 | Iwata et al. |
| 2011/0073341 A1 | 3/2011 | Elsmark |
| 2012/0036725 A1 | 2/2012 | Osborne et al. |
| 2012/0255752 A1 | 10/2012 | Aoki |
| 2013/0081840 A1 | 4/2013 | Aoki |
| 2013/0189901 A1 | 7/2013 | Klee et al. |
| 2013/0319710 A1 | 12/2013 | Aoki et al. |
| 2014/0053419 A1 | 2/2014 | Leh et al. |
| 2014/0159919 A1 | 6/2014 | Furui et al. |
| 2014/0166323 A1* | 6/2014 | Cooper .................. F16P 3/147 173/176 |
| 2014/0216773 A1 | 8/2014 | Steurer |
| 2014/0231113 A1 | 8/2014 | Steurer |
| 2014/0262392 A1* | 9/2014 | Petrossians ............ G01M 1/36 73/458 |
| 2015/0075827 A1 | 3/2015 | Ikuta |
| 2016/0080810 A1 | 3/2016 | Dutta et al. |
| 2016/0089757 A1 | 3/2016 | Wirnitzer et al. |
| 2016/0167212 A1 | 6/2016 | Wyler et al. |
| 2016/0288308 A1 | 10/2016 | Kuhnle et al. |
| 2016/0354888 A1 | 12/2016 | Huber et al. |
| 2017/0173749 A1 | 6/2017 | Stock et al. |
| 2017/0173750 A1 | 6/2017 | Stock et al. |
| 2017/0180536 A1 | 6/2017 | Stock et al. |
| 2017/0234484 A1* | 8/2017 | Vanko .................. B24B 23/028 173/176 |
| 2018/0043521 A1 | 2/2018 | Moessnang et al. |
| 2019/0126456 A1 | 5/2019 | Abbott et al. |

FOREIGN PATENT DOCUMENTS

| | | | |
|---|---|---|---|
| CN | 102274993 A | 12/2011 | |
| CN | 102794477 A | 11/2012 | |
| CN | 102990121 A | 3/2013 | |
| CN | 203304623 U | 11/2013 | |
| CN | 103029105 B | 10/2015 | |
| CN | 105190032 A | 12/2015 | |
| CN | 104440739 B | 6/2016 | |
| CN | 107000087 A | 8/2017 | |
| DE | 2933076 C2 | 12/1982 | |
| DE | 202011110069 U1 | 2/2013 | |
| DE | 102011089343 A1 | 6/2013 | |
| DE | 102016203925 A1 | 9/2017 | |
| EP | 0345655 B1 | 3/1994 | |
| EP | 1398119 A1 | 3/2004 | |
| EP | 2612733 A2 | 7/2013 | |
| EP | 2617529 A2 | 7/2013 | |
| EP | 2656977 A2 | 10/2013 | |
| EP | 2578362 B1 | 7/2014 | |
| EP | 2982864 A1 | 2/2016 | |
| EP | 3050676 A1 | 8/2016 | |
| EP | 3069824 A1 | 9/2016 | |
| EP | 2390062 B1 | 3/2017 | |
| EP | 3588525 A1 * | 1/2020 | ............ B25B 21/02 |
| GB | 1428917 A | 3/1976 | |
| GB | 2400811 A | 10/2004 | |
| JP | 2018020421 A | 2/2018 | |
| WO | 2009032314 A1 | 3/2009 | |
| WO | 2009136839 A1 | 11/2009 | |
| WO | 2011039542 A1 | 4/2011 | |
| WO | 2011085194 A1 | 7/2011 | |
| WO | 2017001363 A1 | 1/2017 | |
| WO | 2019035088 A1 | 2/2019 | |
| WO | WO-2019035088 A1 * | 2/2019 | ......... A61B 17/1615 |

* cited by examiner

KICKBACK CONTROL METHODS FOR A POWER TOOL INCLUDING A FORCE SENSOR

RELATED APPLICATIONS

This application claims the benefit of U.S. Provisional Patent Application No. 62/987,515, filed Mar. 10, 2020, the entire content of which is hereby incorporated by reference.

FIELD

The present invention relates to preventing and reducing kickback of a power tool and to controlling the power tool.

SUMMARY

Embodiments described herein provide a power tool including a housing having a motor housing portion, a handle portion, and a battery pack interface. The power tool further includes a motor within the motor housing portion and having a rotor and a stator. The rotor is configured to rotationally drive a motor shaft about a rotational axis. The power tool further includes at least one grip sensor supported by the housing and configured to generate a grip parameter, a switching network electrically coupled to the motor, and an electronic processor connected to the switching network and the at least one grip sensor. The electronic processor is configured to implement kickback control, wherein, to implement the kickback control, the electronic processor is configured to determine a kickback threshold based on the grip parameter, control the switching network to drive the motor, receive a signal related to a power tool characteristic, determine, based on the power tool characteristic being greater than or equal to the kickback threshold, that a kickback of the power tool is occurring, and control, in response to determining that the kickback event is occurring, the switching network to cease driving of the motor.

In some embodiments, the power tool characteristic comprises a measurement of an angular velocity of the housing of the power tool received at time intervals, and the electronic processor is configured to receive, within a first time period, a plurality of measurements of the angular velocity of the housing of the power tool, determine whether each measurement of the angular velocity is greater than or equal to the kickback threshold, increment a counter for each measurement of the angular velocity that is determined to be greater than or equal to the kickback threshold, determine that the counter is greater than or equal to a counter threshold, and control, in response to determining that the counter is greater than or equal to the counter threshold, the switching network to cease driving of the motor.

In some embodiments, the at least one grip sensor includes a first grip sensor supported by the handle portion and a second grip sensor supported by the motor housing portion, and the grip parameter includes an indication of a one-handed grip or a two-handed grip. In some embodiments, the kickback threshold is a first kickback threshold when the grip parameter indicates a one-handed grip, and wherein the kickback threshold is a second kickback threshold when the grip parameter indicates a two-handed grip, wherein the second kickback threshold is greater than the first kickback threshold. In some embodiments, the at least one grip sensor includes a pressure sensor, and the grip parameter indicates a grip strength. In some embodiments, the power tool is prevented from being operated unless the grip strength is a non-zero value.

In some embodiments, the power tool characteristic is a first power tool characteristic, the kickback threshold is a first kickback threshold, and the electronic processor is configured to monitor, in response to the first power tool characteristic being greater than or equal to the first kickback threshold, a second power tool characteristic, and determine that the kickback of the power tool is occurring based on the second power tool characteristic being greater than or equal to a second kickback threshold. In some embodiments, the first monitored power tool characteristic is a motor current, and the second power tool characteristic is a rotation speed of the housing.

Some embodiments provide a method for kickback control of a power tool having a housing. The method includes determining a kickback threshold based on a grip parameter, the grip parameter provided by at least one grip sensor supported by the housing and configured to generate the grip parameter, controlling a switching network to drive a motor, wherein the motor is housed within a motor housing portion of the housing and having a rotor and a stator, wherein the rotor is configured to rotationally drive a motor shaft about a rotational axis, and wherein the switching network is electrically coupled to the motor, receiving a signal related to a power tool characteristic, determining, based on the power tool characteristic being greater than or equal to the kickback threshold, that a kickback event of the power tool is occurring, and controlling, in response to determining that the kickback event is occurring, the switching network to cease driving of the motor.

In some embodiments, the power tool characteristic comprises a measurement of an angular velocity of the housing of the power tool received at time intervals, and the method further includes determining, within a first time period, a plurality of measurements of the angular velocity of the housing of the power tool, determining whether each measurement of the angular velocity is greater than or equal to the kickback threshold, incrementing a counter for each measurement of the angular velocity that is determined to be greater than or equal to the kickback threshold, determining that the counter is greater than or equal to a counter threshold, and controlling, in response to determining that the counter is greater than or equal to the counter threshold, the switching network to cease driving of the motor.

In some embodiments, the at least one grip sensor includes a first grip sensor supported by the handle portion and a second grip sensor supported by the motor housing portion, wherein the grip parameter include an indication of a one-handed grip or a two-handed grip. In some embodiments, the kickback threshold is a first threshold when the grip parameter indicates a one-handed grip, and the kickback threshold is a second threshold when the grip parameter indicates a two-handed grip, wherein the second threshold is greater than the first threshold. In some embodiments, the at least one grip sensor includes a pressure sensor, and the grip parameter indicates a grip strength. In some embodiments, the power tool is prevented from being operated unless the grip strength is a non-zero value.

In some embodiments, the power tool characteristic is a first power tool characteristic, the kickback threshold is a first kickback threshold, and the method further includes monitoring, in response to the first power tool characteristic being greater than or equal to the first kickback threshold, a second power tool characteristic, and determining that the kickback of the power tool is occurring based on the second power tool characteristic being greater than or equal to a second kickback threshold. In some embodiments, the first monitored power tool characteristic is a motor current, and the second power tool characteristic is a rotation speed of the housing.

Some embodiments provide a power tool including a housing having a motor housing portion, a handle portion, and a battery pack interface. The power tool further includes a motor within the motor housing portion and having a rotor and a stator. The rotor is configured to rotationally drive a motor shaft about a rotational axis. The power tool includes a first grip sensor supported by the handle portion and a second grip sensor supported by the motor housing portion. The first grip sensor and the second grip sensor are configured to generate a grip parameter, the grip parameter including an indication of a one-handed grip or a two-handed grip. The power tool includes a switching network electrically coupled to the motor, and an electronic processor coupled to the switching network and the at least one grip sensor. The electronic processor is configured to select one of a first threshold and a second threshold based on the grip parameter, wherein the first threshold is selected when the grip parameter indicates the one-handed grip, and wherein the second threshold is selected when the grip parameter indicates the two-handed grip. The electronic processor is configured to receive a signal related to a power tool characteristic, and control, in response to whether the power tool characteristic is greater than or equal to the selected one of the first threshold and the second threshold, the switching network to control driving of the motor.

In some embodiments, the second threshold is greater than the first threshold. In some embodiments, the grip parameter indicates a grip strength, and the power tool is prevented from being operated unless the grip strength is a non-zero value. In some embodiments, the electronic processor is configured to control, in response to whether the power tool characteristic is greater than or equal to the selected one of the first threshold and the second threshold, the switching network to cease driving of the motor.

Other embodiments provide a power tool including a housing having an upper main body portion, a handle portion, and a battery interface. The power tool further includes a first force or pressure sensor supported by the housing and configured to generate an output signal based on an amount of force applied to the first force or pressure sensor.

Some embodiments include a power tool that includes a housing and a motor within the housing. The motor includes a rotor and a stator, and the rotor is coupled to a drive device to produce an output. The power tool further includes a switching network electrically coupled to the motor and an orientation sensor configured to monitor an orientation of the power tool. The power tool further includes an electronic processor coupled to the switching network and the orientation sensor. The electronic processor is configured to determine an orientation of the power tool based on information received from the orientation sensor. The electronic processor is further configured to set a kickback sensitivity parameter based on the orientation of the power tool. The electronic processor is further configured to monitor a power tool characteristic associated with the kickback sensitivity parameter. The electronic processor is further configured to determine that a kickback of the power tool is occurring based on the monitored power tool characteristic reaching a kickback threshold. The electronic processor is further configured to control the switching network to cease driving of the motor in response to the monitored power tool characteristic reaching the kickback threshold.

Other embodiments include a power tool including a housing and a motor within the housing. The motor includes a rotor and a stator and the rotor is coupled to a drive device to produce an output. The power tool further includes a switching network electrically coupled to the motor and an electronic processor coupled to the switching network. The electronic processor is configured to determine a battery characteristic of a battery pack coupled to the power tool. The electronic processor is further configured to set a kickback sensitivity parameter based on the battery characteristic of the battery pack. The electronic processor is further configured to monitor a power tool characteristic associated with the kickback sensitivity parameter. The electronic processor is further configured to determine that a kickback of the power tool is occurring based on the monitored power tool characteristic reaching a kickback threshold. The electronic processor is further configured to control the switching network to cease driving of the motor in response to the power tool characteristic reaching the kickback threshold.

Other embodiments include a power tool including a housing and a motor within the housing. The motor includes a rotor and a stator, and the rotor is coupled to a drive device to produce an output. The power tool further includes a switching network electrically coupled to the motor and a sensor configured to monitor a condition indicative of kickback of the power tool. The power tool further includes an electronic processor coupled to the switching network and the sensor. The electronic processor is configured to set a kickback sensitivity parameter and monitor a power tool characteristic associated with the kickback sensitivity parameter. The electronic processor is further configured to determine that a kickback event is occurring based on the monitored power tool characteristic. The electronic processor is further configured to adjust the kickback sensitivity parameter based on the kickback event. The electronic processor is further configured to determine that a kickback of the power tool is occurring based on the monitored power tool characteristic reaching a kickback threshold. The electronic processor is further configured to control the switching network to cease driving of the motor in response to the monitored power tool characteristic reaching the kickback threshold.

Other embodiments include power tool including a housing and a motor within the housing. The motor includes a rotor and a stator, and the rotor is coupled to a drive device to produce an output. The power tool further includes a trigger and a switching network electrically coupled to the motor. The power tool further includes an orientation sensor configured to monitor an orientation of the power tool and an electronic processor coupled to the switching network and the orientation sensor. The electronic processor is configured to determine an initial roll position of the power tool at a time that the trigger is initially actuated based on information received from the orientation sensor. The electronic processor is further configured to monitor the roll position of the power tool. The electronic processor is further configured to determine that the roll position of the power tool has changed such that a difference between the roll position and the initial roll position is greater than or equal to a roll position threshold. The electronic processor is further configured to control the switching network to reduce power supplied to the motor in response to determining that the difference between the roll position and the initial roll position is greater than or equal to the roll position threshold.

In some embodiments, after the power supplied to the motor is reduced, the electronic processor is further configured to determine that the roll position of the power tool has further changed such that the roll position corresponds to the initial roll position. The electronic processor is also further configured to control the switching network to increase the power supplied to the motor in response to determining that the roll position corresponds to the initial roll position.

Other embodiments include a power tool including a housing and a motor within the housing. The motor includes a rotor and a stator, and the rotor is coupled to a drive device to produce an output. The power tool further includes a trigger and a switching network electrically coupled to the motor. The power tool further includes a sensor configured to monitor a condition indicative of kickback of the power tool and an electronic processor coupled to the switching network and the sensor. The electronic processor is configured to control the switching network such that the motor rotates in a forward direction at a first speed when the trigger is actuated. The electronic processor is further configured to determine that the power tool has experienced a kickback based on information received from the sensor, wherein the kickback indicates that the drive device is bound in a workpiece. The electronic processor is further configured to control the switching network to cease driving of the motor in response to determining that the power tool has experienced a kickback. The electronic processor is further configured to in response to determining that the power tool has experienced a kickback, control the switching network such that the motor rotates in a reverse direction at a second speed that is less than the first speed.

In some embodiments, the electronic processor is configured to control the switching network such that the motor rotates in the reverse direction at the second speed when the trigger is actuated.

In some embodiments, the electronic processor is configured to control the switching network such that the motor rotates in the reverse direction without the trigger being actuated.

In some embodiments, the electronic processor is configured to determine that the housing of the power tool has rotated to a desired position and control the switching network to cease driving of the motor in response to determining that the housing of the power tool has rotated to the desired position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, unless noted otherwise, "near," "approximately," and substantially may refer to within 5% or 10% of a particular value, or within 5 or 10 degrees of a particular angle, in the case of an angle.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

DETAILED DESCRIPTION

Figure 1:
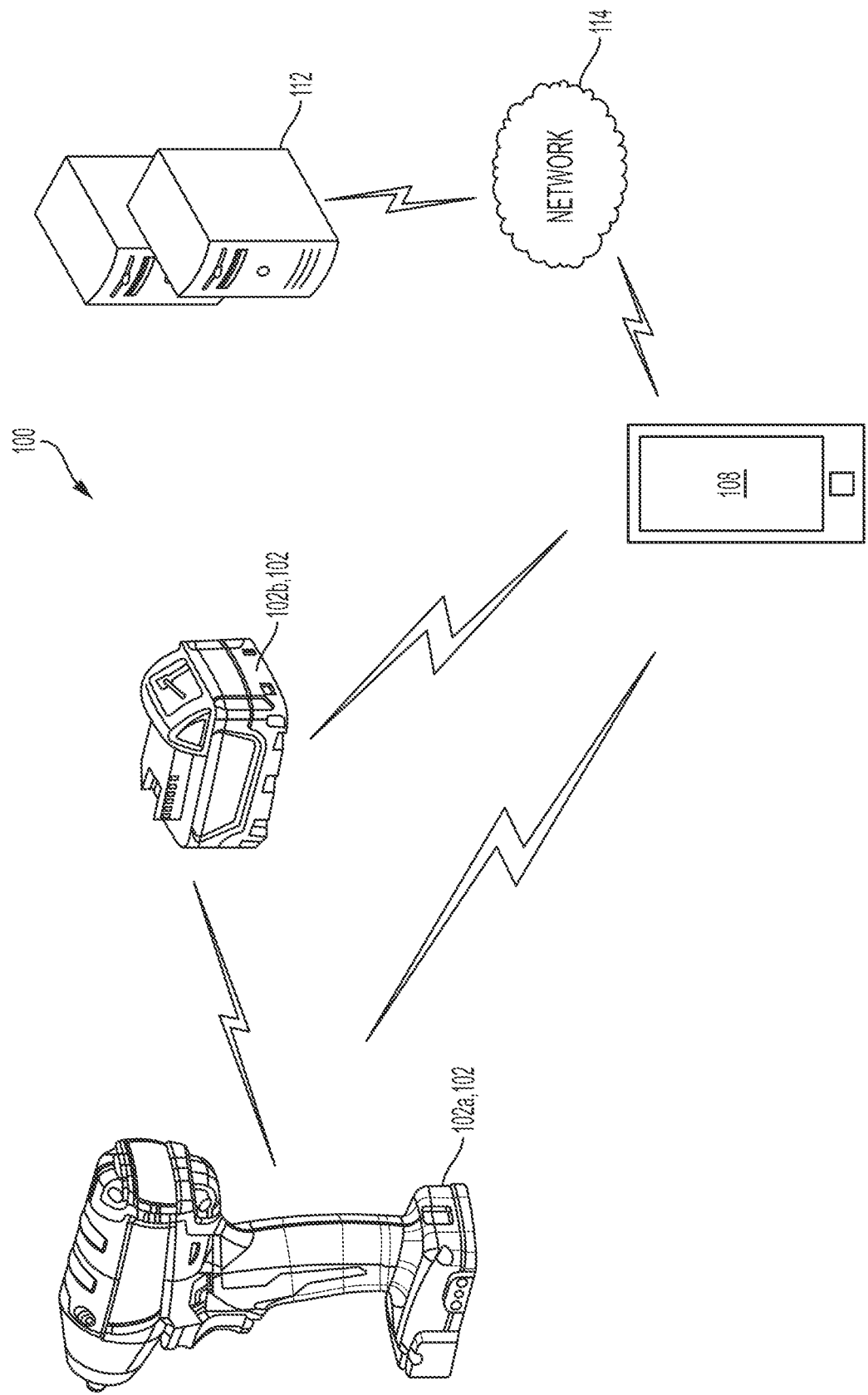
FIG. 1 illustrates a communication system according to one embodiment of the invention.

FIG. 1 illustrates a communication system 100. The communication system 100 includes power tool devices 102 and an external device 108. Each power tool device 102 (e.g., power tool 102a and power tool battery pack 102b) and the external device 108 can communicate wirelessly while they are within a communication range of each other. Each power tool device 102 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 is also configured to transmit data to the power tool device 102 for power tool configuration, firmware updates, or to send commands (e.g., turn on a work light). The external device 108 also allows a user to set operational parameters, safety parameters, select tool modes, and the like for the power tool device 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 provides a user interface and allows a user to access and interact with tool information. The external device 108 is configured to receive user inputs to determine operational parameters, enable or disable features, and the like. The user interface of the external device 108 provides an easy-to-use interface for the user to control and customize operation of the power tool 102a.

Figure 3:
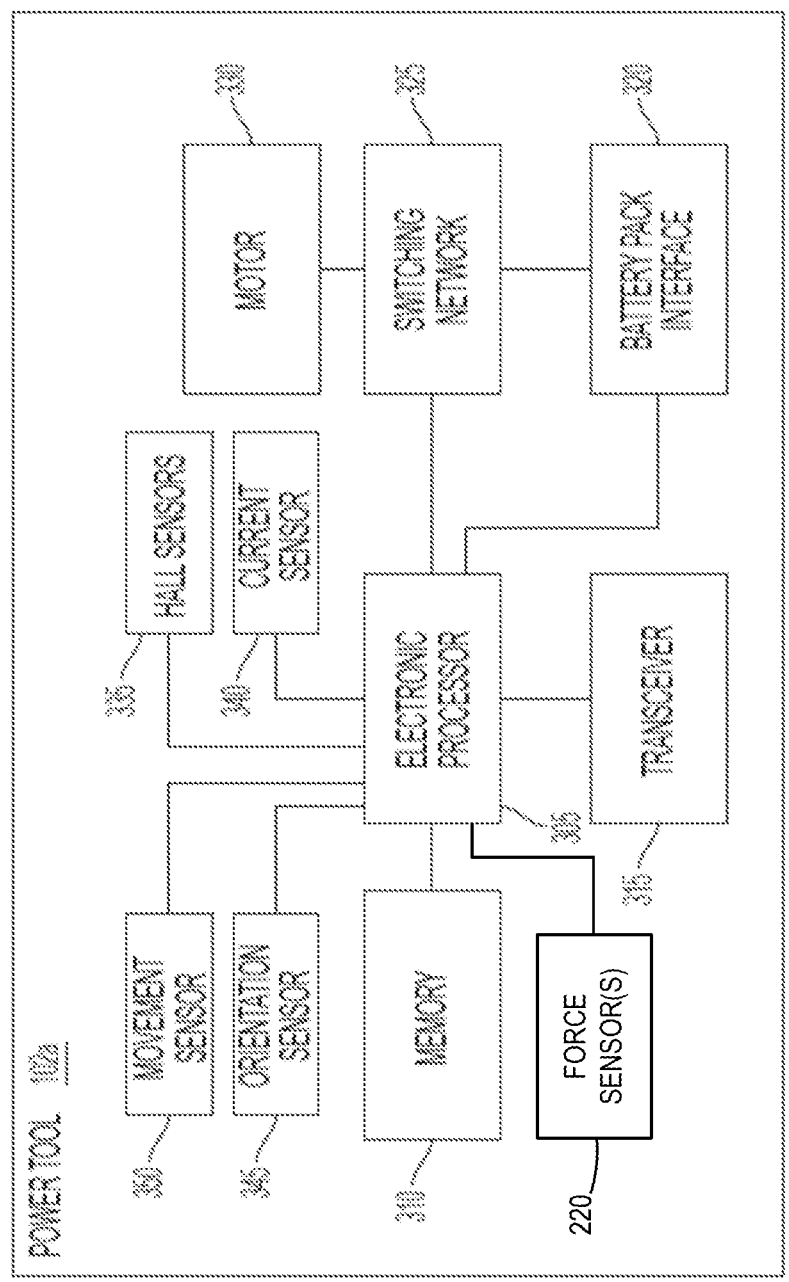
FIG. 3 illustrates a block diagram of the power tool of FIGS. 2A and 2B according to one example embodiment.

The external device 108 includes a communication interface that is compatible with a wireless communication interface of the power tool device 102 (e.g., transceiver 315 shown in FIG. 3). The communication interface of the external device 108 may include a wireless communication controller (e.g., a Bluetooth® module), or a similar component. The external device 108, therefore, grants the user access to data related to the power tool device 102, and provides a user interface such that the user can interact with an electronic processor of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless interface or with the same wireless interface that the power tool device 102 uses to communicate with the external device 108.

In some embodiments, the power tool 102a and power tool battery pack 102b may wirelessly communicate with each other via respective wireless transceivers within each device. For example, the power tool battery pack 102b may communicate a battery characteristic to the power tool 102a (e.g., a battery pack identification, a battery pack type, a battery pack weight, a current output capability of the battery pack 102b, and the like). Such communication may occur while the battery pack 102b is coupled to the power tool 102a. Additionally or alternatively, the battery pack 102b and the power tool 102a may communicate with each other using a communication terminal while the battery pack 102b is coupled to the power tool 102a. For example, the communication terminal may be located near the battery terminals in the battery pack receiving portion 206 of FIGS. 2A and 2B.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench and a hammer drill are associated with the task of generating a rotational output (e.g., to drive a bit).

Figure 2A:
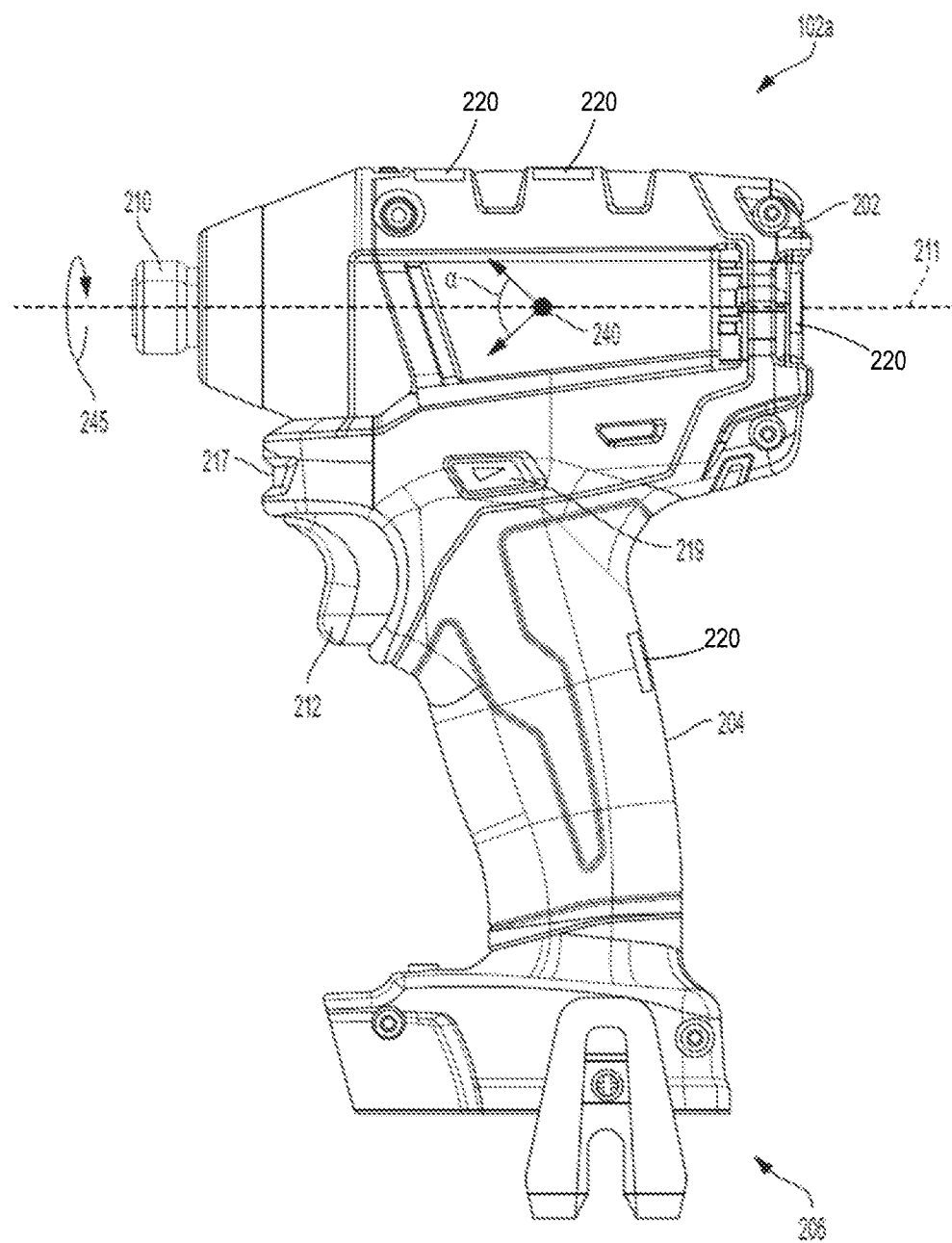
FIGS. 2A and 2B illustrate an example power tool of the communication system of FIG. 1 according to two example embodiments.
Figure 2B:
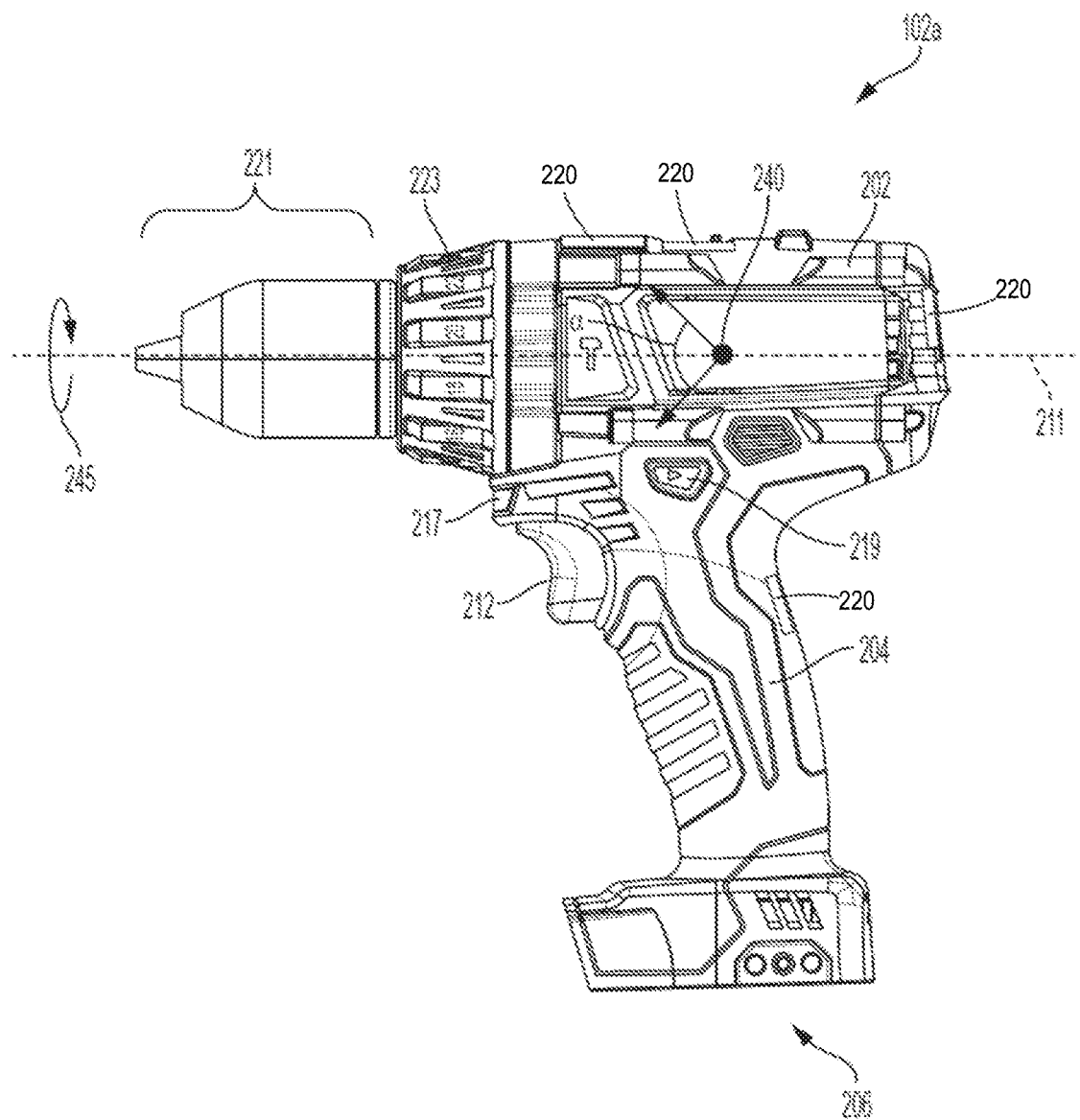

FIGS. 2A and 2B illustrate the power tool 102a according to two example embodiments. In the embodiment shown in FIG. 2A, the power tool 102a is an impact driver. In the embodiment shown in FIG. 2B, the power tool 102a is a hammer drill. In FIGS. 2A and 2B, similar elements are labeled with the same reference numbers. The power tools 102a of FIGS. 2A and 2B are representative of various types of power tools that operate within the system 100. Accordingly, the description with respect to the power tool 102a in the system 100 is similarly applicable to other types of power tools, such as right angle drills, joist and stud drills, other drills, ratchets, screwdrivers, concrete mixers, hole diggers, rotary tools, and the like.

As shown in FIG. 2A, the power tool 102a includes an upper main body 202, a handle 204, a battery pack receiving portion 206, an output driver 210, a trigger 212, a work light 217, a forward/reverse selector 219, and one or more force sensors 220 (e.g., grip sensors, pressure sensors, grip pressure sensors, etc.) for detecting a magnitude and/or direction of a force applied to the power tool 102a. The housing of the power tool 102a (e.g., the main body 202 and the handle 204) are composed of a durable and light-weight plastic material. The output driver 210 is composed of a metal (e.g., steel). The output driver 210 on the power tool 102a is a female socket configured to hold a bit or similar device. However, other power tools may have a different output driver 210 specifically designed for the task associated with the other power tools, such as a chuck to hold a drill bit (see FIG. 2B), an arbor to hold a saw blade, a reciprocating saw blade holder, or a male socket driver. The battery pack receiving portion 206 is configured to receive and couple to a battery pack (e.g., battery pack 102b of FIG. 1) that provides power to the power tool 102a. The battery pack receiving portion 206 includes a connecting structure to engage a mechanism that secures the battery pack and a terminal block to electrically connect the battery pack to the power tool 102a.

The power tool 102a includes a motor housed within the upper main body 202. The motor includes a rotor and a stator. The rotor is coupled to the output driver 210 to produce an output about a rotational axis 211 to allow the output driver 210 to perform the particular task. In some embodiments, the trigger 212 is a mechanical switch that generates an actuation signal dependent on how far a user of the power tool 102a engages the trigger 212. In some embodiments, the trigger 212 is a pressure sensor and does not move when the user presses the trigger 212. Rather, the trigger 212 generates an actuation signal indicating how hard a user is pressing on the trigger 212 and pressure sensor. In some embodiments, a metal-on-capacitor sensing arrangement is used. The motor is energized based on the position of the trigger 212 for a mechanical switch or based on the amount of pressure applied to the trigger 212 for a pressure sensor. The language depressing the trigger 212, as used herein, does not necessarily imply motion of the trigger 212.

Unless overriding control features are activated, when the trigger 212 is depressed the motor is energized, and when the trigger 212 is released, the motor is de-energized. In the illustrated embodiment, the trigger 212 extends partially down a length of the handle 204; however, in other embodiments the trigger 212 extends down the entire length of the handle 204 or may be positioned elsewhere on the power tool 102a.

For a mechanical trigger 212, the trigger 212 is moveably coupled to the handle 204 such that the trigger 212 moves with respect to the tool housing. The trigger 212 is coupled to a push rod, which is engageable with a trigger switch. The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch, and when the trigger 212 is released by the user, the trigger switch is deactivated.

In other embodiments, the trigger 212 is coupled to an electrical trigger switch. In such embodiments, the trigger switch may include, for example, a transistor. Additionally, for such electronic embodiments, the trigger 212 may not include a push rod to activate the mechanical switch. Rather, the electrical trigger switch may be activated by, for example, a position sensor (e.g., a Hall-Effect sensor) that relays information about the relative position of the trigger 212 to the tool housing or electrical trigger switch. The trigger switch outputs a signal indicative of the position of the trigger 212. In some instances, the signal is binary and indicates either that the trigger 212 is depressed or released. In other instances, the signal indicates the position of the trigger 212 with more precision. For example, the trigger switch may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch may be analog or digital.

In other embodiments, the trigger 212 includes a force or pressure sensor that does not significantly change in position when depressed by the user. The pressure sensor may output an analog actuation signal that varies from 0 volts to 5 volts depending on the amount of pressure applied by the user. The actuation signal output by the pressure sensor may be analog or digital.

The grip sensors 220 generate output signals that provide grip parameters indicating that the user is holding the power tool 102a and how the user is holding the power tool 102a. For example, if the user has one hand on the power tool 102a, the grip sensor 220 on the handle 204 will sense the user's hand. If the user has a second hand on the upper main body 202, one or more of the grip sensors 220 will detect the presence of the second hand. In some embodiments, the grip sensors 220 are touch sensors (e.g., capacitive sensors) that generate a binary signal if they are activated. In other embodiments, the grip sensors 220 are force or pressure sensors that provide a signal proportional to the strength of the force applied to the sensor (e.g., a user's grip pressure). Thus, the grip parameters may include grip position (e.g., how the power tool 102a is being held) and grip strength (e.g., non-zero grip strength value to indicate presence). In some embodiments, the power tool 102a is prevented from being used or operated (e.g., is non-operational) unless the user's grip is detected (e.g., non-zero grip strength value) on the handle 204 (e.g., for a grinder, chainsaw, etc.). In some embodiments, the power tool 102a is prevented from being turned off (e.g., is constantly operational) unless the user's grip is not detected on the handle 204 (e.g., for a vacuum cleaner, etc.).

As shown in FIG. 2B, the power tool 102a includes many similar components as the power tool 102a shown in FIG. 2A. For example, the hammer drill of FIG. 2B includes an upper main body 202, a handle 204, a battery pack receiving portion 206, a trigger 212, a work light 217, a forward/reverse selector 219, and one or more force sensors 220 (e.g., grip sensors, pressure sensors, grip pressure sensors, etc.). The hammer drill also includes a chuck 221 and torque setting dial 223. As noted above, many elements of the hammer drill of FIG. 2B share reference numbers with respective elements of the impact driver of FIG. 2A. Accordingly, these similarly-labeled elements of FIG. 2B may include similar functionality as that described above with respect to FIG. 2A.

FIG. 3 illustrates a block diagram of the power tool 102a. As shown in FIG. 3, the power tool 102a includes an electronic processor 305 (for example, a microprocessor or other electronic device), a memory 310, a transceiver 315, a battery pack interface 320, a switching network 325, a motor 330, Hall sensors 335, a current sensor 340, an orientation sensor 345, a movement sensor 350, and one or more force sensors 220 (e.g., grip sensors, pressure sensors, grip pressure sensors, etc.). In some embodiments, the power tool 102a may include fewer or additional components in configurations different from that illustrated in FIG. 3. For example, in some embodiments, the power tool 102a may include one or more indicators such as light-emitting diodes (LEDs) to indicate a status of the power tool 102a or a mode of the power tool 102a. In some embodiments, the power tool 102a may include multiple orientation sensors 345 and/or movement sensors 350. In some embodiments, the power tool 102a may perform functionality other than the functionality described below.

For example, the electronic processor 305 is configured to adjust one or more of the settings, mode, and motor speed of the power tool 102a based on signals received from one or more sensors of the power tool 102a, as explained in greater detail below.

The transceiver 315 sends and receives data to and from the external device 108, the network 114, or both, as explained above. For example, through the transceiver 315, the electronic processor 305 may send stored power tool usage or maintenance data to the external device 108 and may receive operational parameters or tool modes from the external device 108.

The battery pack interface 320 transmits power received from the battery pack to the electronic processor 305 and the switching network 325. Although not shown in FIG. 3, in some embodiments, the power tool 102a includes active and/or passive components (e.g., voltage step-down controllers, voltage converters, rectifiers, filters, etc.) to regulate or control the power received through the battery pack interface 320 and provided to the electronic processor 305 and/or the motor 330.

The switching network 325 enables the electronic processor 305 to control the operation of the motor 330. Generally, when the trigger 212 is depressed, electrical current is supplied from the battery pack interface 320 to the motor 330, via the switching network 325. When the trigger 212 is not depressed, electrical current is not supplied from the battery pack interface 320 to the motor 330. The electronic processor 305 controls the switching network 325 to control the amount of current available to the motor 330 and thereby controls the speed and torque output of the motor 330. The switching network 325 may include numerous FETs, bipolar transistors, or other types of electrical switches. For instance, the switching network 325 may include a six-FET bridge that receives pulse-width modulated (PWM) signals from the electronic processor 305 to drive the motor 330.

The sensors 335, 340, 345, and 350 are coupled to the electronic processor 305 and communicate various signals to the electronic processor 305 that are indicative of different parameters of the power tool 102a or the motor 330. Although not shown in FIG. 3, in some embodiments, the power tool 102a includes additional sensors such as one or more voltage sensors, one or more temperature sensors, one or more torque sensors, and the like.

In some embodiments, each Hall sensor 335 outputs motor feedback information to the electronic processor 305, such as an indication (e.g., a pulse) when a magnet of the motor's rotor rotates across the face of that Hall sensor 335. Based on the motor feedback information from the Hall sensors 335, the electronic processor 305 can determine the position, velocity, and acceleration of the rotor. In response to the motor feedback information and the position of the trigger 212, the electronic processor 305 transmits control signals to control the switching network 325 to drive the motor 330. For instance, by selectively enabling and disabling the FETs of the switching network 325, power received via the battery pack interface 320 is selectively applied to stator coils of the motor 330 to cause rotation of its rotor. The motor feedback information is used by the electronic processor 305 to ensure proper timing of control signals to the switching network 325 and, in some instances, to provide closed-loop feedback to control the speed of the motor 330 to be at a desired level. For example, as feedback from the Hall sensors 335 indicates rotation of the rotor, the electronic processor 305 sequentially (a) enables select FET pairs of the switching network 325 such that the magnetic field produced by the associated stator coils continuously drives the rotor and (b) disables the remaining FETs of the switching network 325 such that current is not diverted from the appropriate stator coils and such that the stator coils do not produce a magnetic field that inhibits rotation of the rotor.

In some embodiments, the current sensor 340 monitors current drawn by the motor 330 (i.e., the motor current). In some embodiments, the orientation sensor 345 is an accelerometer and transmits signals to the electronic processor 305 that are indicative of an orientation of the power tool 102a with respect to gravity. For example, the orientation sensor 345 may indicate a pitch or roll of the power tool 102a. The pitch of the power tool 102a is represented by a pitch angle α and indicates the direction in which the output driver 210 is facing along a pitch axis 240 of FIGS. 2A and 2B (e.g., upward, downward, or horizontally). The pitch axis 240, illustrated as a point, extends in an out of the page in the view of FIGS. 2A and 2B. The roll of the power tool 102a indicates a position/angle with respect to gravity of the power tool 102a about the rotational axis 211 (usually when the power tool 102a is oriented horizontally). For example, FIGS. 2A and 2B illustrate a roll motion 245 about the rotational axis 211.

In some embodiments, the movement sensor 350 is a gyroscope and transmits signals to the electronic processor 305 that are indicative of an angular velocity of the power tool 102a. For example, in a situation where the output of the power tool 102a is bound in a workpiece (i.e., during a kickback of the power tool 102a as described in greater detail below), signals from the movement sensor 350 may indicate the angular velocity at which the housing of the power tool 102a rotates about its rotational axis (e.g., in degrees per second).

Figure 6:
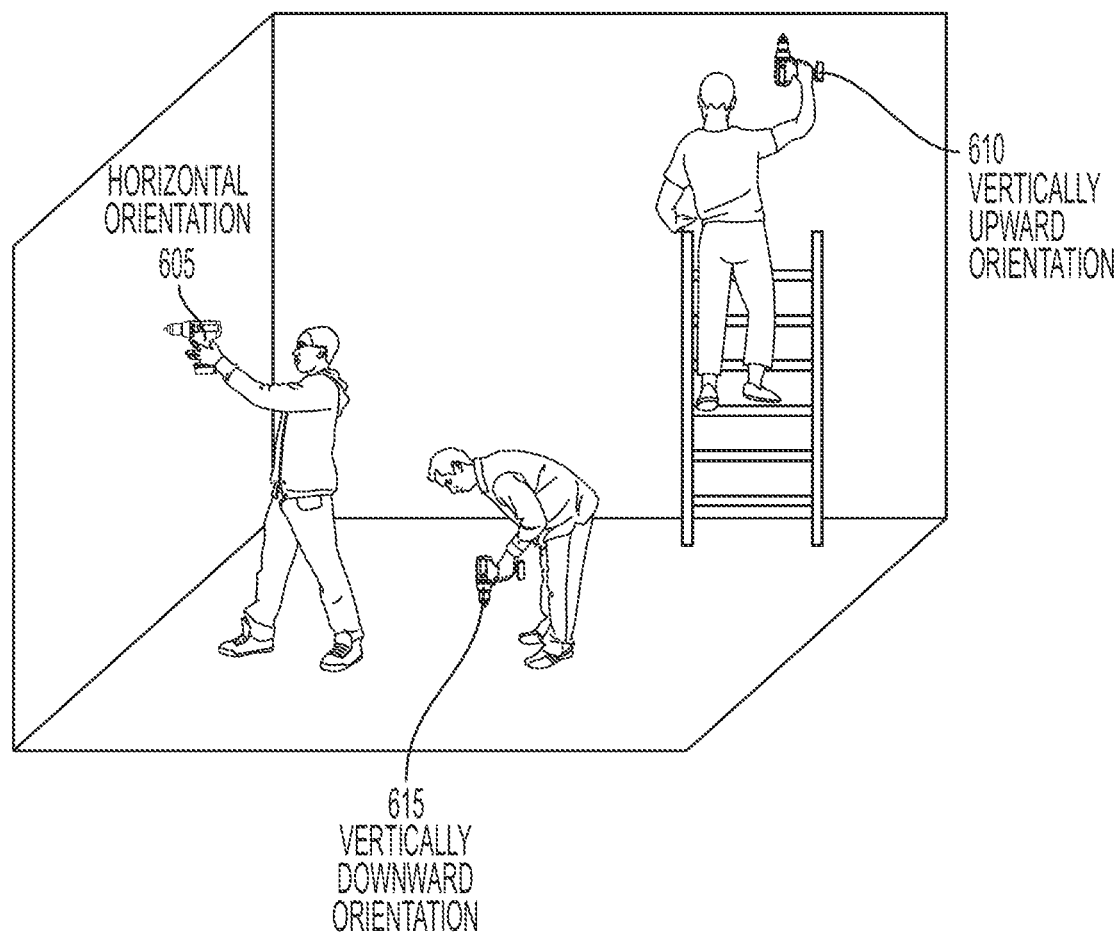
FIG. 6 illustrates three example orientations of the power tool of FIGS. 2A and 2B.

In some embodiments, the electronic processor 305 monitors roll position of the power tool 102a to determine when kickback of the power tool 102a is occurring. For example, the electronic processor 305 may compare a current roll position of the power tool 102a during operation to an initial roll position when the trigger 212 was actuated or to a preferred roll position (e.g., a horizontal orientation 605 with the rotational axis of the power tool 102a at ninety degrees with respect to gravity as shown in FIG. 6). In some embodiments, the electronic processor 305 directly monitors the current roll position of the power tool 102a by receiving signals from the orientation sensor 345 that indicate the roll position of the power tool 102a. In other embodiments, the electronic processor 305 infers the current roll position of the power tool 102a based on the initial roll position when the trigger 212 was actuated (as determined by direct measurement from the orientation sensor 345) and monitored angular velocity of the housing of the power tool 102 (as determined by the movement sensor 350). In other words, the electronic processor 305 indirectly determines the current roll position of the power tool 102a by multiplying the current angular velocity measurement by the amount of time between angular velocity measurements to determine a roll movement. The electronic processor 305 then adds the roll movement to the initial roll position of the power tool 102a to determine a current roll position of the power tool 102a.

In some embodiments, the sensors 345 and 350 may include one or more accelerometers, gyroscopes, or magnets that may be separate or integrated into a single assembly. In some embodiments, the sensors 345 and 350 allow for movement of the power tool 102a to be monitored from one to nine axes (e.g., at least one of three axis monitoring, six axis monitoring, and nine axis monitoring). In some embodiments, the power tool 102a includes an inertial measurement unit (IMU) printed circuit board (PCB) that includes the sensors 345 and 350. In some embodiments, the IMU PCB is located in the foot of the power tool 102a (i.e., near the battery pack receiving portion 206) and communicates information obtained by the sensors 345 and 350 to the electronic processor 305 located on a control PCB in the handle 204 of the power tool 102a. In such embodiments, the IMU PCB is isolated from vibration caused by the motor 330 and may accurately monitor the roll position of the power tool 102a about the rotational axis 211. In some embodiments, the IMU PCB is located at other locations in the power tool 102a. For example, the IMU PCB may be located underneath the motor 330 (e.g., above the handle 204 or at the upper portion of the handle 204). As another example, the IMU PCB may be located above the motor 330.

In some situations, the power tool 102a may kickback when the output of the power tool 102a becomes bound in a workpiece such that the output remains stationary. In such situations, the torque provided by the rotational inertia of the power tool 102a may overpower the force of the user's hand or hands on the power tool 102a causing the housing of the power tool 102a to rotate outside of the user's control. In some embodiments, the electronic processor 305 implements kickback control functionality to prevent or reduce kickback of the power tool 102a based on signals received from one or more of the sensors 220, 335, 340, 345, and 350.

Figure 4:
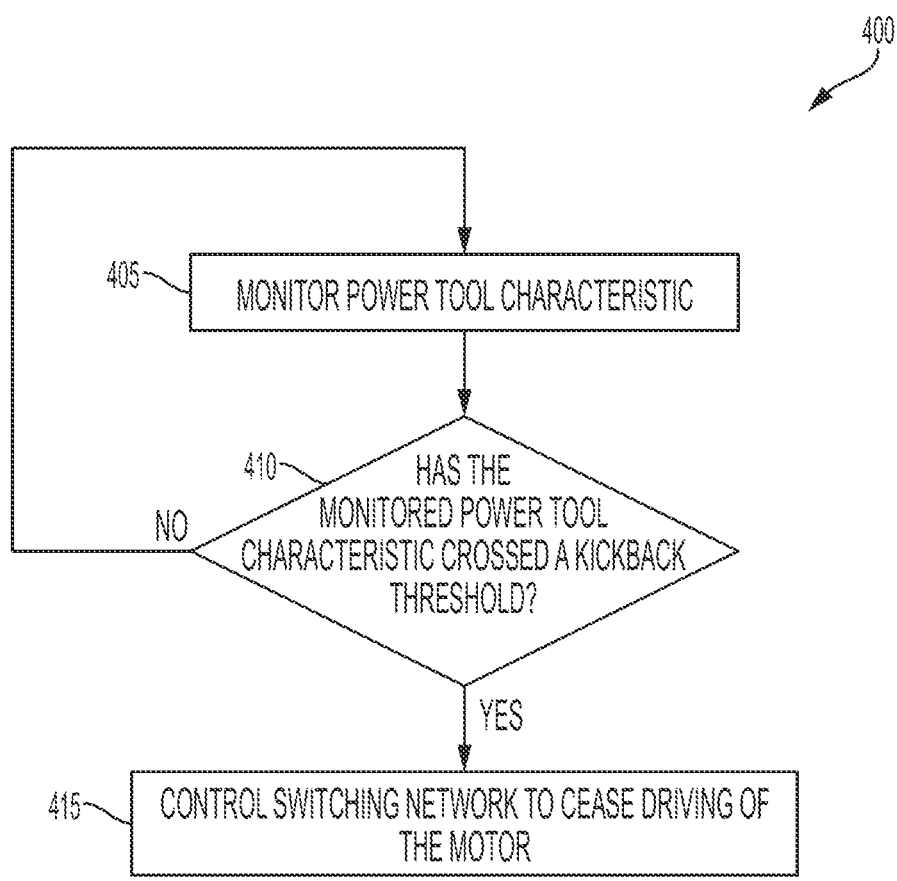
FIG. 4 illustrates a flowchart of an example method of detecting kickback of the power tool of FIGS. 2A and 2B and ceasing driving of a motor of the power tool in response to detecting the kickback.

FIG. 4 illustrates a flowchart of an example method 400 of detecting kickback of the power tool 102a and ceasing (e.g., controlling) driving of the motor 330 in response to detecting the kickback. At block 405, the electronic processor 305 monitors a power tool characteristic of the power tool 102a using one or more sensors. For example, the power tool characteristic may be a motor current monitored using the current sensor 340, an angular velocity of a housing of the power tool 102a monitored using the movement sensor 350, a roll position of the power tool 102a directly monitored using the orientation sensor 345 or indirectly monitored using a combination of the orientation sensor 345 and the movement sensor 350, or the like.

In some embodiments, when monitoring the power tool characteristic, the electronic processor 305 may implement a filtering method to filter data received from the sensors to control the accuracy of the received data. For example, the electronic processor 305 may pass data through a low pass filter to remove spikes in data that may be caused by normal tool operation or may be generated due to errors made by the sensor. In other situations, the electronic processor 305 may lessen the effect of the low pass filter or may not implement the low pass filter such that the electronic processor 305 recognizes shorter direction spikes in data received from the sensors. As another example of a filtering method, when signals are received from the movement sensor 350 that indicate movement in multiple directions, the electronic processor 305 may give more weight to movement in a certain direction.

At block 410, the electronic processor 305 determines whether the power tool characteristic has reached a kickback threshold. This determination may indicate whether kickback of the power tool 102a is occurring where the housing of the power tool 102a rotates outside of the user's control. In some embodiments, the kickback threshold may be a minimum value or a maximum value. For example, in some situations, a decrease in motor current is indicative of a start of kickback or some other loss of control of the power tool 102a by the user. For example, the decrease in motor current may indicate that the user is no longer applying pressure on the power tool 102a toward the workpiece. However, in other situations, an increase in motor current is indicative of a start of kickback (for example, when the power tool 102a encounters a tougher material than the workpiece such as rebar behind a piece of wood). In embodiments where the power tool characteristic is current, the kickback threshold may be a current threshold in Amps or a rate of change in current in Amps per second. In embodiments where the power tool characteristic is angular velocity, the kickback threshold is a rotation speed threshold (e.g., in degrees per second) of the housing of the power tool 102a. In embodiments where the power tool characteristic is roll position, the kickback threshold is a working operating angle range in which the housing of the power tool 102a may rotate before the motor 330 is shut down (e.g., plus-or-minus a number of degrees from an initial roll position or a preferred roll position of the power tool 102a). In embodiments with a different power tool characteristic, the electronic processor 305 uses a kickback threshold corresponding to the different power tool characteristic. In some embodiments, the electronic processor 305 sets the kickback threshold based on the speed of the motor 330. For example, in some embodiments, the method 400 is updated to include a first additional block (e.g., between blocks 405 and 410) for the electronic processor 305 to determine motor speed and a second additional block (e.g., between the first additional block and block 410) for the electronic processor 305 to update the kickback threshold based on the determined motor speed (e.g., using a lookup table mapping motor speeds to thresholds). In one example, as the speed of the motor 330 increases, the kickback threshold is updated to be more sensitive. For example, in embodiments where the power tool characteristic is angular velocity, the electronic processor 305 may use a lower kickback threshold (i.e., higher kickback sensitivity) when the speed of the motor 330 is high than when the speed of the motor 330 is lower. In this example, the kickback threshold changes dynamically based on the speed of the motor 330. In some embodiments, the kickback threshold is set or updated based on the user's detected hand position. If the force sensors 220 indicate one-handed use, a default kickback threshold is employed. If the force sensors 220 indicate two-handed use or an increased grip strength, the kickback threshold is increased to reduce its sensitivity, since the user is likely to have better tool control with two hands. The kickback threshold may be updated dynamically as changes to the user's grip are detected by the force sensors 220.

In some embodiments, the electronic processor 305 is configured to utilize two different kickback thresholds. For example, in embodiments where the power tool characteristic is angular velocity and the kickback threshold is a rotation speed threshold of the housing of the power tool 102a, a first rotation speed threshold that is lower (i.e., more sensitive) than a second rotation speed threshold may be utilized by the electronic processor 305. Because kickback of the power tool 102a most often occurs in a direction opposite of the rotation of the motor 330, the electronic processor 305 utilizes the first rotation speed threshold to detect kickback in the direction opposite of the rotation of the motor 330. In some embodiments, the first rotation speed threshold is lower (i.e., more sensitive) than a second rotation speed threshold utilized to detect kickback in the same direction of the rotation of the motor 330. Accordingly, when the forward/reverse selector 219 is actuated to change the rotational direction in which the output driver 210 is driven, the first and second rotation speed threshold correspondingly change such that the kickback threshold is more sensitive and shuts the power tool 102a more quickly based on an angular velocity of the housing of the power tool 102a in a direction opposite of the rotation of the motor 330. For example, when the output driver 210 is rotated in a clockwise direction, it is more likely that kickback of the power tool 102a will occur in a counter-clockwise direction. Therefore, samples indicating an angular velocity in the clockwise direction (which are less likely or unlikely to be a kickback of the power tool 102a) are handled with greater tolerance than samples indicating an angular velocity in the counter-clockwise direction (which are more likely to be a kickback of the power tool 102a). The different rotation speed thresholds depending on the direction of the angular velocity that is measured with respect to the rotational direction of the output driver 210 are intended to reduce nuisance shutdowns, for example, in the use case of operators rotating the tool themselves during operation. In some embodiments, the rotation speed thresholds are adjusted based on motor direction and grip parameters to reduce the relative sensitivity if a two-handed or strong grip is employed.

In some embodiments, the monitored power tool characteristic is the actuation signal from the trigger 212 and the kickback threshold is a predetermined change in the amount of trigger actuation or a predetermined change in the amount of trigger actuation over a predetermined time period (i.e., a speed of trigger release). In such embodiments, the kickback threshold indicates when the trigger 212 has been released to cause the electronic processor 305 to control the switching network 325 to cease driving of the motor 330. For example, the electronic processor 305 may determine that the actuation signal from the trigger 212 has changed such that the trigger 212 is being or has been released by the user. Accordingly, this kickback threshold may be referred to as a trigger release sensitivity of the power tool 102a because it determines how quickly the electronic processor 305 controls the switching network 325 to cease driving the motor 330 in response to changes in position of the trigger 212.

When the electronic processor 305 determines that the monitored power tool characteristic has not reached the kickback threshold (at block 410), the method 400 proceeds back to block 405 to continue monitoring the power tool characteristic. When the electronic processor 305 determines that the monitored power tool characteristic has reached the kickback threshold, at block 415, the electronic processor 305 controls the switching network 325 to cease driving of the motor 330. For example, the electronic processor 305 may prevent the switching network 325 from supplying power to the motor 330, may stop the motor 330 using active braking, or may cease driving of the motor 330 in another manner.

Although the method 400 is described above with respect to one power tool characteristic, in some embodiments, the electronic processor 305 monitors a plurality of power tool characteristics and compares each of the monitored power tool characteristics to a respective kickback threshold. In some of these embodiments, the electronic processor 305 controls the switching network 325 to cease driving of the motor 330 in response to a predetermined number of the plurality of power tool characteristics reaching their respective kickback thresholds. In some embodiments, when a first monitored power tool characteristic (e.g., motor current) reaches its respective kickback threshold (e.g., decreases below a low current threshold), the electronic processor 305 begins monitoring a second power tool characteristic (e.g., angular velocity of the power tool 102a). In such embodiments, when the second power tool characteristic reaches its respective threshold (e.g., increases above a rotation speed threshold), the electronic processor 305 controls the switching network 325 to cease driving of the motor 330. Additionally, in some embodiments, the electronic processor 305 monitors a plurality of power tool characteristics and adjusts at least one kickback sensitivity parameter based on at least one of the monitored power tool characteristics (e.g., see FIGS. 10 and 16 and corresponding explanation below). In some embodiments, by comparing a plurality of measurements of power tool characteristics to their respective kickback thresholds allows the electronic processor 305 to detect kickback of the power tool 102a and shuts down the motor 330 but also prevent nuisance shutdowns of the motor 330 (i.e., preventing frequent shutdown of the motor 330 when the user still has control of the power tool 102a). For example, the electronic processor shuts down the motor 330 in response to multiple measurements of a single power tool characteristic exceeding its respective kickback threshold or measurements of multiple power tool characteristics exceeding their respective kickback thresholds. In other words, in some embodiments, a single measurement of a power tool characteristic that exceeds its kickback threshold may not cause the electronic processor 305 to cease driving the motor 330 and, accordingly, may improve operator experience by preventing nuisance shutdowns of the motor 330.

Figure 15:
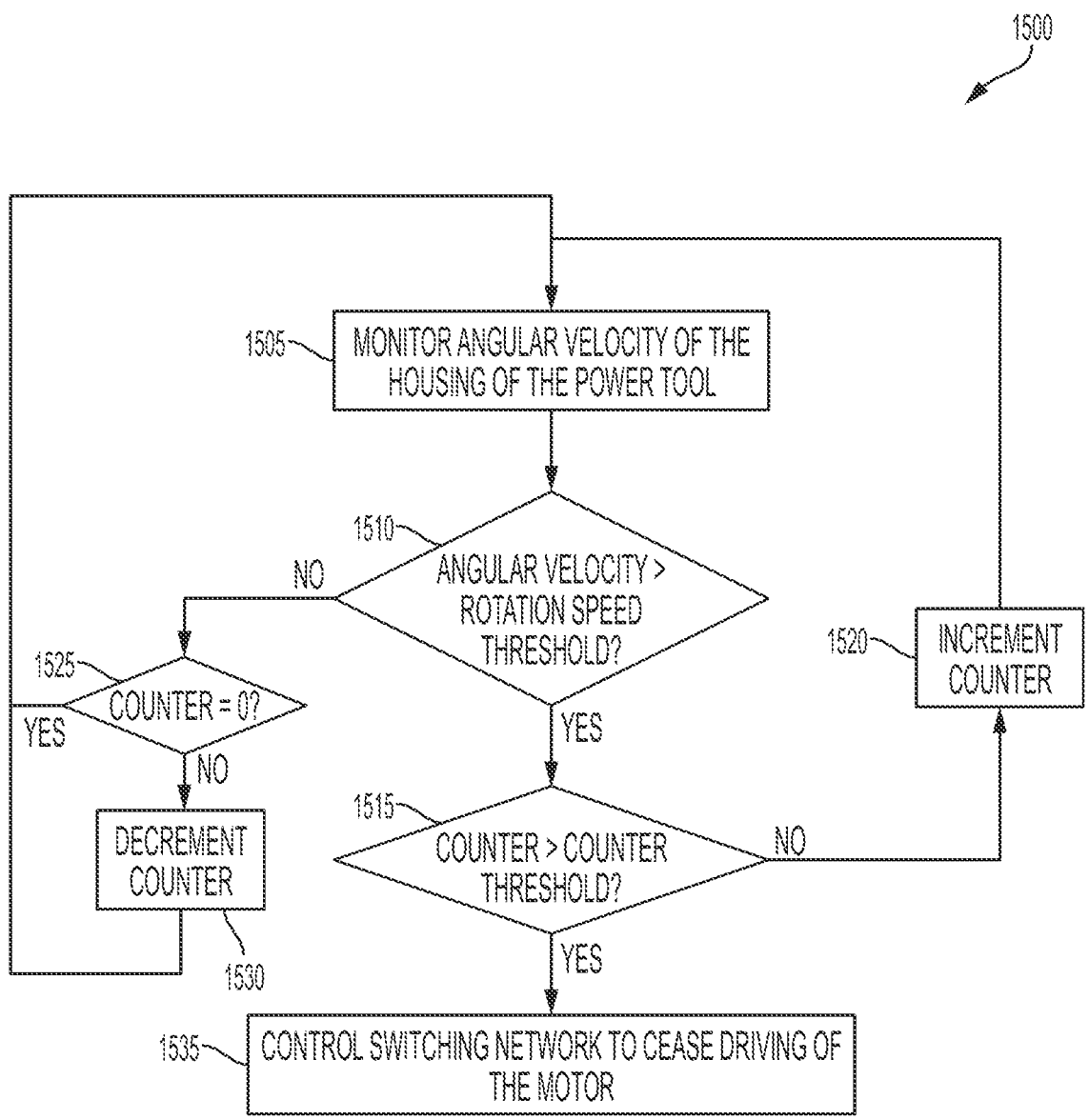
FIG. 15 illustrates a flowchart of another method of detecting kickback of the power tool of FIGS. 2A and 2B and ceasing driving of the motor in response to detecting the kickback.

FIG. 15 illustrates a flowchart of another method of detecting kickback of the power tool 102a and ceasing driving of the motor 330 in response to detecting the kickback. The method 1500 allows the electronic processor 305 to detect kickback of the power tool 102a when the angular velocity of the housing of the power tool 102a has exceeded a rotation speed threshold a predetermined number of times within a time period. However, in some embodiments, the electronic processor 305 may monitor a different power tool characteristic to determine when a different power tool characteristic exceeds a respective kickback threshold a predetermined number of times within a time period. In some embodiments, the time period is a predetermined time period (for example, 250 milliseconds, 500 milliseconds, one second, or the like). In other embodiments, the time period is not predetermined and instead the time period lasts for as long as the trigger 212 is actuated and the power tool 102a is running. In other words, the counter explained below with respect to FIG. 15 may rise and fall for as long as the power tool 102a is running, and may reset when the trigger 212 is released. In such embodiments, the method 1500 allows the electronic processor 305 to detect kickback of the power tool 102a by a threshold crossing of a leaky accumulator augmented in response to the angular velocity of the housing of the power tool 102a exceeding a rotation speed threshold. Additionally, in some embodiments, the leaky accumulator acts as a leaky accumulator of some function of rotational speed or some other power tool characteristic whereby kickback is detected upon the leaky accumulator being augmented above an associated threshold for the other power tool characteristic. Similarly, a leak rate of leaky accumulator may not be constant and may be set by the electronic processor 305 as a function of a power tool characteristic. In some embodiments, a leaky accumulator, as described herein, may be a function implemented by the electronic processor 305.

At block 1505, the electronic processor 305 monitors an angular velocity of the housing of the power tool 102a (e.g., using information received from the movement sensor 350). At block 1510, the electronic processor 305 determines whether the angular velocity is greater than a rotation speed threshold. When the angular velocity is greater than the rotation speed threshold, the method 1500 proceeds to block 1515 where the electronic processor 305 determines whether a counter is greater than a counter threshold. When the counter is not greater than the counter threshold, the method 1500 proceeds to block 1520 where the electronic processor 305 increments the counter by one because the angular velocity has exceeded the rotation speed threshold. Then the method 1500 proceeds back to block 1505 to continue monitoring the angular velocity of the housing of the power tool 102a. In some embodiments, before proceeding back to block 1505, the electronic processor 305 may delay a predetermined time period in order to sample angular velocity data from the movement sensor 350 at predetermined intervals. In some embodiments, the predetermined time period that defines a sampling rate of angular velocity data from the movement sensor 350 is dynamically determined by the electronic processor 305 based on another power tool characteristic (for example, based on the orientation of the power tool 102a or the grip parameters).

When the angular velocity is not greater than the rotation speed threshold (at block 1510), the method 1500 proceeds to block 1525 where the electronic processor 305 determines whether the counter is equal to zero. When the counter is equal to zero, the method 1500 proceeds back to block 1505 to continue monitoring the angular velocity of the housing of the power tool 102a. When the counter is not equal to zero, at block 1530, the electronic processor 305 decrements the counter by one because the angular velocity is not greater than the rotation speed threshold. Then, the method 1500 proceeds back to block 1505 to continue monitoring the angular velocity of the housing of the power tool 102a. In some embodiments, before proceeding back to block 1505, the electronic processor 305 may delay a predetermined time period in order to sample angular velocity data from the movement sensor 350 at predetermined intervals. As mentioned above, in some embodiments, the predetermined time period that defines a sampling rate of angular velocity data from the movement sensor 350 is dynamically determined by the electronic processor 305 based on another power tool characteristic (for example, based on the orientation of the power tool 102a or the grip parameters).

When the counter is greater than the counter threshold (at block 1515), the method 1500 proceeds to block 1535 where the electronic processor 305 controls the switching network 325 to cease driving of the motor 330. Accordingly, the method 1500 allows the electronic processor 305 to detect kickback of the power tool 102a when the angular velocity of the housing of the power tool 102a has exceeded a rotation speed threshold a predetermined number of times within a time period as defined by the counter threshold. In other words, with reference to the explanation of a leaky accumulator above, the method 1500 allows the electronic processor 305 to detect kickback of the power tool 102a when the angular velocity of the housing of the power tool 102a has augmented a leaky accumulator above some threshold. In some embodiments, the rotation speed threshold, the counter threshold, and the time delay between monitored samples of the angular velocity may be referred to as kickback sensitivity parameters that may be adjusted to refine kickback control of the power tool 102a in accordance with other portions of this application. For example, one or more of the rotation speed threshold, the counter threshold, and the time delay may be adjusted by a user via an external device 108 (see FIG. 5). In some embodiments, one or more of the rotation speed threshold, the counter threshold, and the time delay may be adjusted based on the grip parameters. The power tool 102a then receives one or more of these kickback sensitivity parameters from the external device 108, and the electronic processor 305 executes the method 1500 using the values of the received kickback sensitivity parameters. For example, the lower the rotation speed threshold, the counter threshold, and the time delay, the more sensitive the kickback control. Higher, less sensitive kickback control may be employed if the user adopts a two-handed or strong grip, as detected by the force sensors 220. As noted above, in some embodiments, the electronic processor 305 executes the method 1500 as the power tool 102a is running and may reset the counter when the trigger 212 is released or when a predetermined time period elapses. For example, an additional conditional block may be added before looping back to block 1505 in which the electronic processor 305 determines whether the predetermined time period has elapsed, the trigger has been released, or both, and, when true, resets the counter to zero. Further, when the trigger has been released and the counter is reset, the processor may cease running the method 1500 until the next trigger pull.

In some embodiments, the method 1500 detects kickback of the power tool 102a and shuts down the motor 330 but also prevents nuisance shutdowns of the motor 330 (i.e., preventing frequent shutdown of the motor 330 when the user still has control of the power tool 102a). For example, through use of the counter, the method 1500 shuts down the motor 330 in response to multiple measurements of the angular velocity of the housing of the power tool 102a exceeding the rotation speed threshold. In other words, in some embodiments, a single measurement of angular velocity that exceeds the rotation speed threshold may not cause the electronic processor 305 to cease driving the motor 330 and, accordingly, may improve operator experience by preventing nuisance shutdowns of the motor 330.

Figure 16:
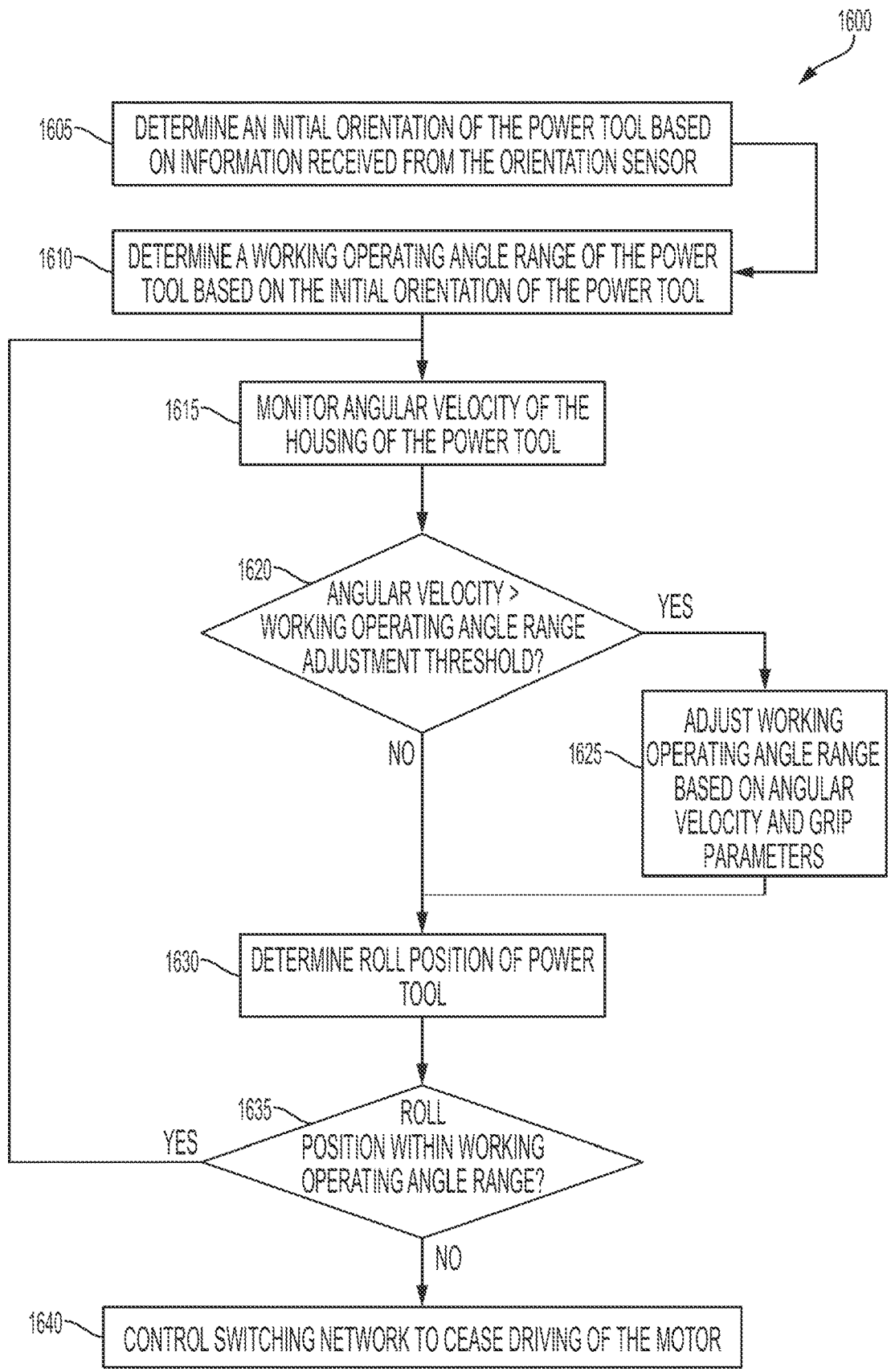
FIG. 16 illustrates a flowchart of an example method of detecting kickback of the power tool of FIGS. 2A and 2B where the method adjusts a working operating angle range based on a monitored angular velocity of the housing of the power tool of FIGS. 2A and 2B.

As mentioned above, in some embodiments, the electronic processor 305 monitors a plurality of power tool characteristics and adjusts at least one kickback sensitivity parameter based on at least one of the monitored power tool characteristics. FIG. 16 illustrates a flowchart of an example method 1600 of detecting kickback of the power tool 102a where the method 1600 adjusts a working operating angle range (i.e., a kickback sensitivity parameter) based on a monitored angular velocity of the housing of the power tool 102a (i.e., a monitored power tool characteristic). The method 1600 allows the electronic processor 305 to detect kickback of the power tool 102a when the roll position of the power tool 102a is outside a working operating angle range that is updated based on the angular velocity of the housing of the power tool 102a. Some of the blocks of the method 1600 are similar to blocks from other methods explained below (e.g., FIGS. 7 and 10).

Blocks 1605 and 1610 of FIG. 16 are similar to blocks 705 and 710 of FIG. 7 explained below. At block 1605, the electronic processor 305 determines an initial orientation of the power tool 102a based on information received from the orientation sensor 345 when the trigger 212 is actuated. In some embodiments, the initial position also includes the grip parameters detected by the force sensors 220. In some embodiments, the electronic processor 305 sets the initial orientation to correspond to an initial roll position of zero. At block 1610, the electronic processor 305 determines a working operating angle range of the power tool 102a based on the initial orientation of the power tool 102a. For example, when the pitch of the power tool 102a indicates that the power tool 102a is facing upward (i.e., in the vertically upward orientation 610 of FIG. 6), the user may be drilling overhead and/or standing on a ladder or scaffolding such that they may have less control of the power tool 102a.

Accordingly, when the electronic processor 305 determines that the output driver 210 of the power tool 102*a* is facing upward, the electronic processor 305 may set a working operating angle range of the power tool 102*a* to be small (e.g., plus-or-minus fifteen degrees from the initial roll position) such that driving of the motor 330 ceases when less kickback is sensed (i.e., higher kickback sensitivity). The kickback sensitivity may be decreased for a two-handed grip relative to a one-handed grip or for a strong grip relative to a weaker grip (e.g., grip strength based on a value for the force applied to a force sensor 220). Additional examples of setting a kickback sensitivity parameter such as the working operating angle range based on the orientation of the power tool 102*a* are explained below with respect to blocks 705 and 710 of FIG. 7.

At block 1615, the electronic processor 305 monitors angular velocity of the housing of the power tool 102*a* using the movement sensor 350. At block 1620, the electronic processor 305 determines whether the angular velocity of the housing of the power tool 102*a* is greater than a working operating angle range adjustment threshold. In some embodiments, an angular velocity above the working operating angle range adjustment threshold may indicate that the user is beginning to lose control of the power tool 102*a* (i.e., a near kickback event as described below with respect to FIG. 10). Accordingly, when the angular velocity is above the working operating angle range adjustment threshold, at block 1625, the electronic processor 305 adjusts the working operating angle range based on the angular velocity and/or the grip parameters. For example, the user may change from a one-handed grip to a two-handed grip or the user may grip the power tool 102*a* harder if the user starts to lose control of the power tool 102*a*. The working operating angle range may be adjusted dynamically if a change in grip parameters is detected by the force sensors 220.

Continuing the above example, the electronic processor 305 may reduce the working operating angle range from plus-or-minus fifteen degrees from the initial roll position of the power tool 102*a* to plus-or-minus ten degrees from the initial roll position of the power tool 102*a*. In other words, the electronic processor 305 increases kickback sensitivity by decreasing the range of roll positions in which the power tool 102*a* is able to rotate without the motor 330 being shut down due to detection of kickback. After the working operating angle range is adjusted, the method 1600 proceeds to block 1630. At block 1620, when the angular velocity is not greater than the working operating angle range adjustment threshold, the method 1600 proceeds to block 1630 without adjusting the working operating angle range. In other words, the working operating angle range remains unchanged because the angular velocity measurement indicates that the housing of the power tool 102*a* is not rotating or is rotating slowly, and the user is not likely losing control of the power tool 102*a*.

At block 1630, the electronic processor 305 determines the current roll position of the power tool 102*a*. As described above, the electronic processor 305 may determine the roll position of the power tool 102*a* either directly or indirectly. At block 1635, the electronic processor 305 determines whether the roll position of the power tool 102*a* is within the working operating angle range. When the roll position is within the working operating angle range, the method 1600 proceeds back to block 1615 to continue to monitor the angular velocity of the housing of the power tool 102*a*. When the roll position is not within the working operating angle range (i.e., when the housing of the power tool 102*a* has rotated outside of the working operating angle range), at block 1640, the electronic processor controls the switching network 325 to cease driving of the motor 330.

Accordingly, the method 1600 allows the electronic processor 305 to detect kickback of the power tool 102*a* when the roll position of the power tool 102*a* is outside a working operating angle range that is updated based on the angular velocity of the housing of the power tool 102*a* and the grip parameters. In some embodiments, the working operating angle range and the working operating angle range adjustment threshold may be referred to as kickback sensitivity parameters that may be adjusted to refine kickback control of the power tool 102*a* in accordance with other portions of this application. Although not shown in FIG. 16, in some embodiments, the electronic processor 305 may re-adjust the working operating angle range back to its originally-set value in response to determining that the angular velocity of the housing of the power tool 102*a* has decreased below a predetermined value or has decreased to zero.

In some embodiments, in addition to shutting down the motor 330 in response to the roll position of the power tool being outside the working operating angle range, the electronic processor 305 also may shut down the motor if the angular velocity exceeds a rotation speed threshold. In some embodiments, the working operating angle range adjustment threshold is less than the rotation speed threshold. In other embodiments, the electronic processor 305 may monitor the angular velocity of the housing of the power tool 102*a* solely for the purpose of updating the working operating angle range and may not shut down the power tool 102*a* based on the angular velocity exceeding the rotation speed threshold. In some embodiments, at block 1610, the electronic processor 305 determines an initial value for the working operating angle range adjustment threshold based on the initial orientation of the power tool 102*a* and the grip parameters in a similar manner as described above with respect to the working operating angle range.

Figure 5:
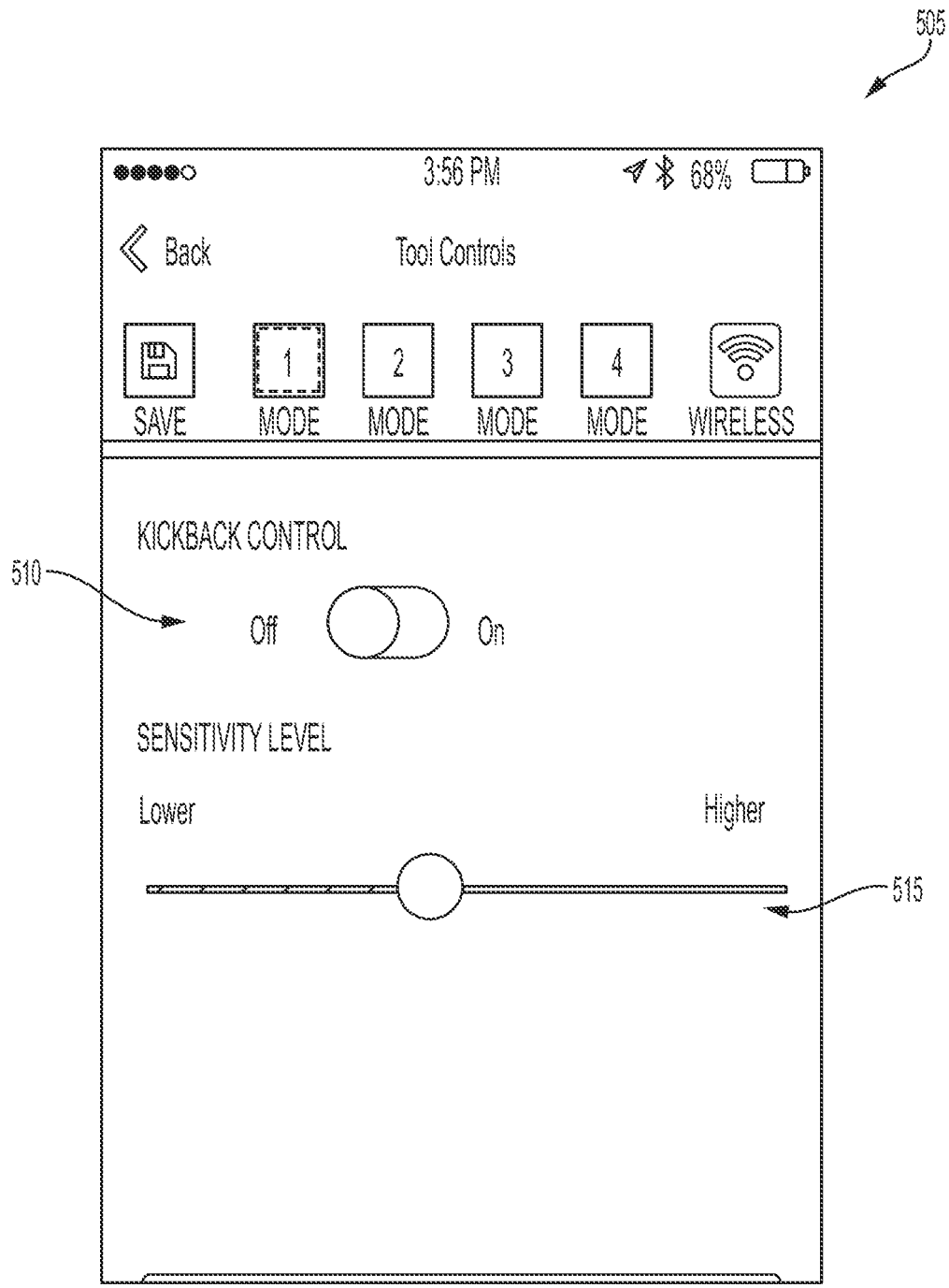
FIG. 5 illustrates an example screenshot of a user interface of an external device of the communication system of FIG. 1.

In some embodiments, the kickback control implemented by the electronic processor 305 is controllable via the external device 108. FIG. 5 illustrates an example screenshot of a user interface 505 of the external device 108 that allows for kickback sensitivity parameters (e.g., kickback thresholds, filtering methods, and the like) to be adjusted by a user. As shown in FIG. 5, kickback control can be optionally turned on or off using a toggle switch 510. In other words, the electronic processor 305 receives a user selection via the toggle switch 510 and the external device 108 indicating whether to implement the method 400 described above. In some embodiments, the power tool 102*a* may include an LED that illuminates to indicate that kickback control is activated.

Also as shown in FIG. 5, a sensitivity level of kickback control can be optionally set using a slider bar 515. In some embodiments, the sensitivity level sets at least one of the kickback thresholds described above (e.g., a current threshold, a rotation speed threshold, a trigger release sensitivity, a working operating angle range, and the like). In other words, the electronic processor 305 receives an indication of the sensitivity level via the slider bar 515 and the external device 108, and adjusts one or more of the kickback thresholds in response to the indication. In some embodiments, the user interface 505 includes a separate slider bar to allow for adjustment of each kickback threshold individually. In some embodiments, the electronic processor 305 turns off the motor 330 in response to less kickback of the power tool 102*a* when the sensitivity level of kickback control is set higher than when the sensitivity level of the kickback control is set lower. In other words, the electronic processor

305 may set the kickback thresholds to levels that are more easily satisfied (e.g., a lower rotation speed threshold or a higher trigger release sensitivity) when the sensitivity level of kickback control is set higher than when the sensitivity level of the kickback control is set lower.

In some embodiments, the sensitivity level sets a filtering method used by the electronic processor 305 when receiving data from the sensors. For example, when the sensitivity level of kickback control is set higher, the electronic processor 305 may lessen the effect of low-pass filtering of one or more sensor signals such that a spike in data may cause a kickback threshold to be reached that ceases driving of the motor 330. On the other hand, when the sensitivity level of kickback control is set lower, the electronic processor 305 may increase the effect of low-pass filtering of one or more sensor signals such that spikes in data are smoothed out to prevent the monitored power tool characteristic from being as likely to cross its respective kickback threshold. Stated another way, the electronic processor 305 may change a filtering rate of one or more sensors of the power tool 102a to sacrifice accuracy for faster response time (when the sensitivity level of kickback control is set higher) or, alternatively, to sacrifice faster response time for accuracy (when the sensitivity level of kickback control is set lower). In some embodiments, the electronic processor 305 sets or adjusts a filtering method of data received from one or more sensors based on the speed of the motor 330.

In some embodiments, the electronic processor 305 establishes and/or adjusts at least one kickback sensitivity parameter based on the orientation of the power tool 102a. FIG. 6 illustrates three example orientations of the power tool 102a including a horizontal orientation 605, a vertically upward orientation 610, and a vertically downward orientation 615. The orientations may be described based on the rotational axis of the power tool (see, for example, rotational axis 211 of the power tool 102a in FIGS. 2A and 2B) with respect to gravity. For example, when the rotation axis is at 90 degrees with respect to gravity, or within a predetermined range of 90 degrees with respect to gravity (e.g., within 5, 10, 15, 25, 35, or 45 degrees), the power tool may be considered in the horizontal orientation 605. Similarly, when the rotation axis is at 180 degrees with respect to gravity, or within a predetermined range of 180 degrees with respect to gravity (e.g., within 5, 10, 15, 25, 35, or 45 degrees), the power tool may be considered in the vertically upward orientation 610. Similarly, when the rotation axis is at 0 degrees (i.e., aligned) with respect to gravity, or within a predetermined range of 0 degrees with respect to gravity (e.g., within 5, 10, 15, 25, 35, or 45 degrees), the power tool may be considered in the vertically downward orientation 615. In other embodiments, another axis of the tool, such as a longitudinal axis of the tool housing or motor rotational axis, is used to determine the orientation of the power tool.

Figure 7:
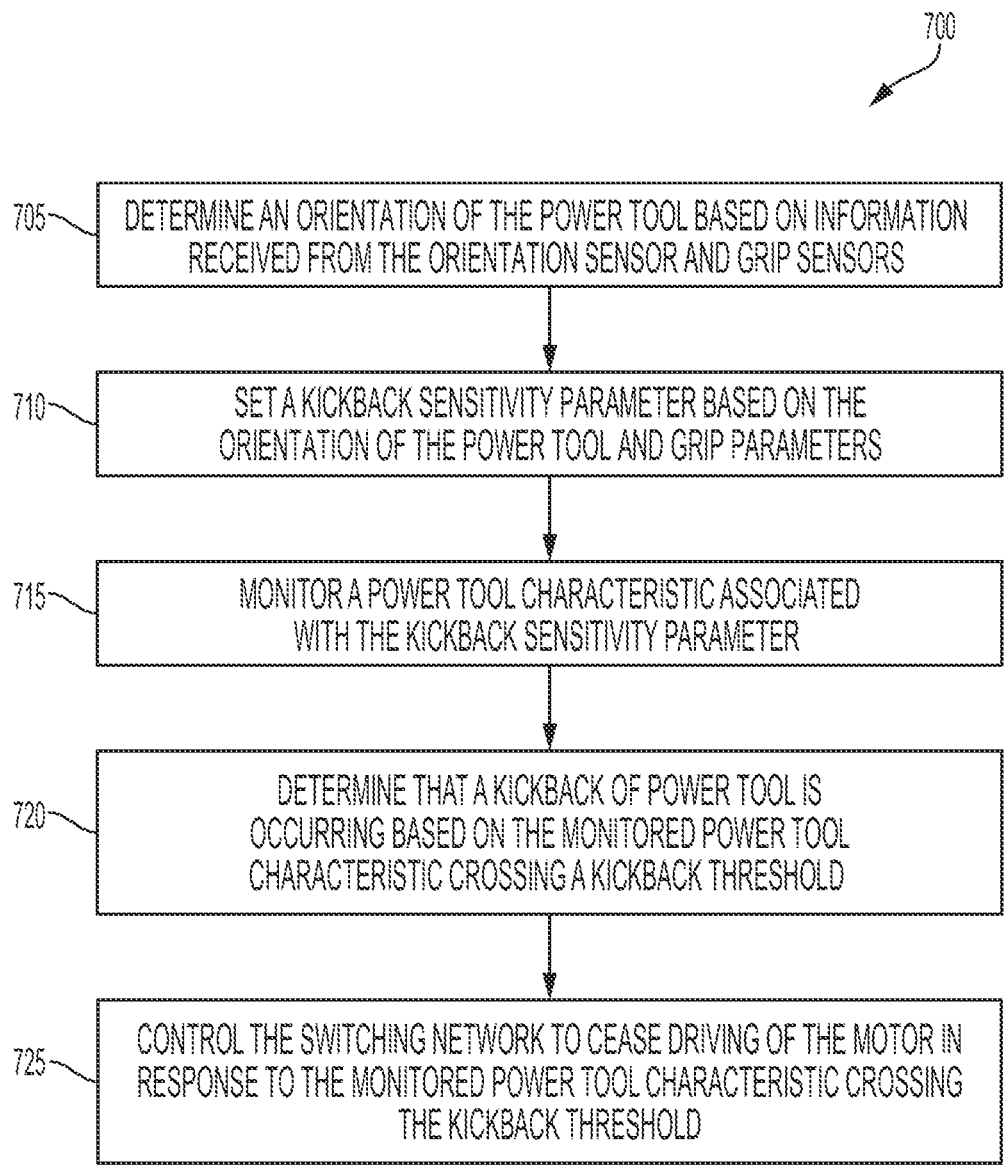
FIG. 7 illustrates a flowchart of an example method of setting a kickback sensitivity parameter based on the orientation of the power tool of FIGS. 2A and 2B.

FIG. 7 illustrates a flowchart of an example method 700 of setting a kickback sensitivity parameter based on the orientation of the power tool 102a. At block 705, the electronic processor 305 determines the orientation of the power tool 102a based on information received from the orientation sensor 345 and the grip sensors 220. For example, the electronic processor 305 receives a signal from the orientation sensor 345 indicating the pitch angle α and compares the pitch angle to threshold ranges for each of the orientations 605, 610, and 615 shown in FIG. 6. The force sensors 220 provide an indication of a one-handed grip or a two-handed grip. In some embodiments, the force sensors 220 also provide a measure of grip strength.

At block 710, the electronic processor sets a kickback sensitivity parameter based on the orientation of the power tool 102a. For example, when the pitch of the power tool 102a indicates that the power tool 102a is facing upward (i.e., in the vertically upward orientation 610 of FIG. 6), the user may be drilling overhead and/or standing on a ladder or scaffolding such that they may have less control of the power tool 102a. Accordingly, when the electronic processor 305 determines that the output driver 210 of the power tool 102a is facing upward, the electronic processor 305 may set at least one kickback sensitivity parameter to be more sensitive such that driving of the motor 330 ceases when less kickback is sensed. For example, the electronic processor 305 may lower the rotation speed threshold in embodiments where the angular velocity of the power tool 102a is being monitored. As another example, the electronic processor 305 may adjust a filtering method to reduce the effect of low-pass filtering such that a spike in data may cause a kickback threshold to be reached that ceases driving of the motor 330. As another example, the electronic processor 305 may set the trigger release sensitivity to exaggerate the quickness of a monitored trigger release by the user. For example, the electronic processor 305 may cease driving of the motor 330 in response to a slight trigger release by the user instead of slowing the speed of the motor 330 as may be done in other situations where the user may have more control of the power tool 102a. As another example, when the orientation of the power tool 102a indicates that the power tool 102a is not being used at a ninety degree angle facing upward, downward, or horizontally (as shown in the three orientations of FIG. 6), the user may have less control of the power tool 102a (e.g., when drilling at a forty-five degree angle). Accordingly, when the electronic processor 305 determines that the output driver 210 of the power tool 102a is not at a ninety degree angle facing upward, downward, or horizontally, the electronic processor 305 may set at least one kickback sensitivity parameter to be more sensitive such that driving of the motor 330 ceases when less kickback is sensed. For example, the electronic processor 305 may lower the rotation speed threshold in embodiments where the angular velocity of the power tool 102a is being monitored or may decrease the working operating angle range where the roll position of the power tool 102a is being monitored.

Figure 8A:
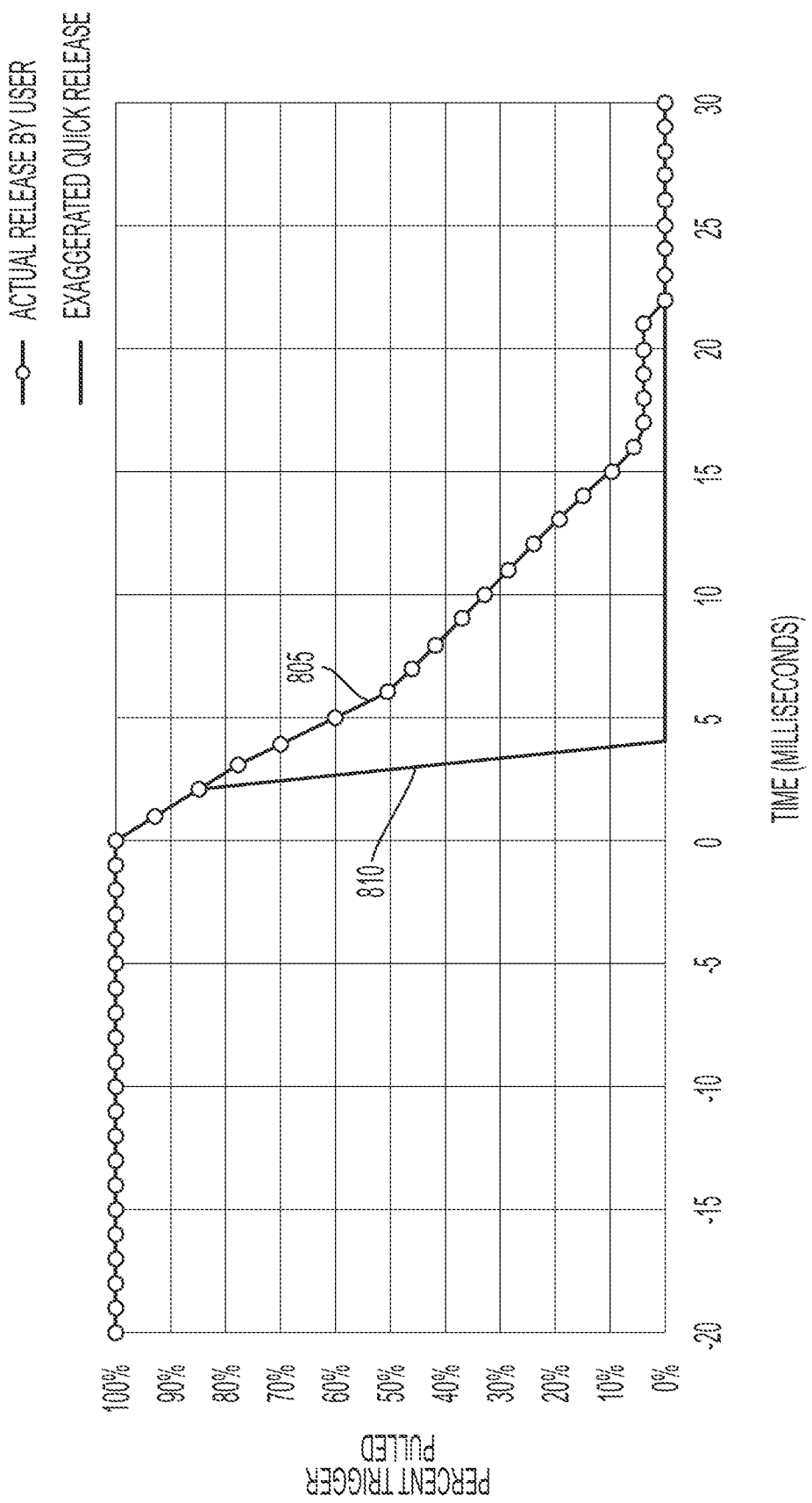
FIGS. 8A and 8B are charts that illustrate an exaggerated quick release feature of the power tool of FIGS. 2A and 2B according to some embodiments.
Figure 8B:
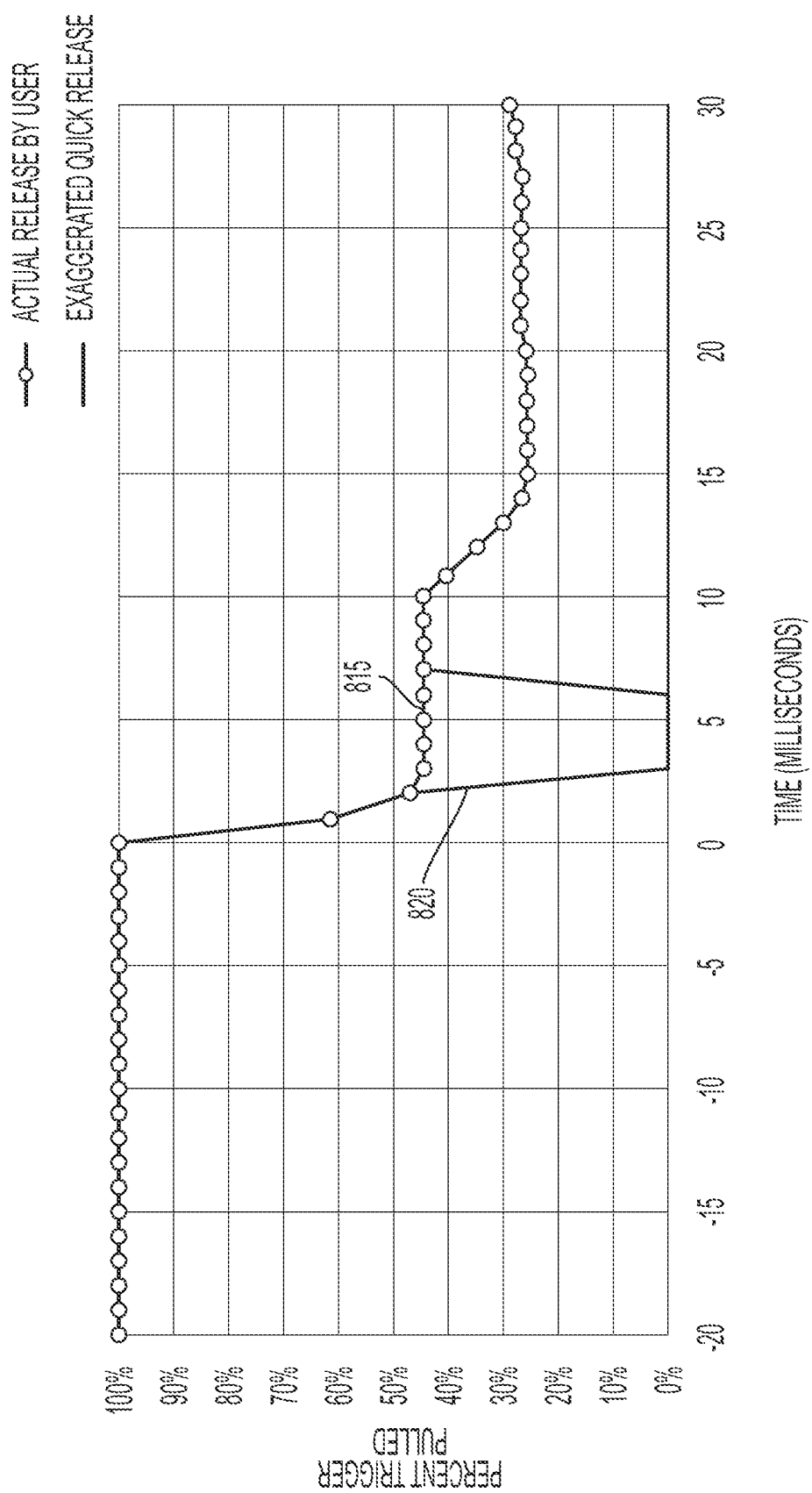

FIGS. 8A and 8B are charts that illustrate the exaggerated quick release implemented by the electronic processor 305 according to some embodiments. Line 805 of FIG. 8A represents the actual position of the trigger 212 over a time period where the user releases the trigger 212. As shown in FIG. 8A, it takes the user approximately twenty-two milliseconds to completely release the trigger 212. However, in situations where the trigger release sensitivity is increased, the electronic processor 305 may cease driving of the motor 330 before the user has completely released the trigger 212. For example, as indicated by line 810 of FIG. 8A, the electronic processor 305 may recognize the change in position of the trigger 212 and cease driving of the motor after approximately five milliseconds. Such control may be useful in situations where release of the trigger 212 may indicate a loss of control of the power tool 102a (e.g., when the power tool 102a is in the vertically upward orientation 610 of FIG. 6).

FIG. 8B illustrates a situation where the trigger 212 is only released part way and is not completely released (i.e., a situation where the user intended to release the trigger 212 only part way to reduce the speed of the motor 330, for example). Similar to FIG. 8A, line 815 indicates the actual position of the trigger 212 over a time period where the user partially releases the trigger 212. As shown in FIG. 8B, similar to line 810 of FIG. 8A, line 820 indicates that the electronic processor 305 ceases driving of the motor 330 in approximately three milliseconds in response to a detected change in position of the trigger 212. However, after a few milliseconds, the electronic processor 305 determines that position of the trigger 212 has remained partially depressed (e.g., steady at approximately 45% actuation) and controls the switching network 325 to provide power to the motor 330 corresponding to the 45% actuation of the trigger 212. In some embodiments, the brief period where the electronic processor 305 ceased driving the motor 330 may occur so quickly that it is unrecognizable to the user. Thus, when the trigger release sensitivity of the power tool 102a is set to implement an exaggerated quick release, the electronic processor 305 may be more sensitive to trigger releases while still maintaining normal operation of the power tool 102a.

Returning to block 710 of FIG. 7, as another example of setting a kickback sensitivity parameter based on the orientation of the power tool 102a, when the pitch of the power tool 102a indicates that the power tool 102a is facing downward (i.e., in the vertically downward orientation 615 of FIG. 6), the user may be in a more stable situation (e.g., located on the floor with both hands on the power tool 102a). Accordingly, when the electronic processor 305 determines that the output driver 210 of the power tool 102a is facing downward, the electronic processor 305 may set at least one kickback sensitivity parameter to be less sensitive such that driving of the motor 330 is not ceased when minor kickback is sensed. In such situations, the trigger release sensitivity may be set not to implement exaggerated quick release of the trigger 212.

As yet another example of setting a kickback sensitivity parameter based on the orientation of the power tool 102a, when the roll of the power tool 102a indicates that the power tool 102a is sideways to the ground when the pitch of the power tool 102a indicates that the power tool 102a is facing horizontally (i.e., in the horizontal orientation 605 of FIG. 6), an arm of the user may be in such a position that it is not able to rotate much further if, for example, kickback occurs. Accordingly, when the electronic processor 305 determines that the power tool 102a is sideways with respect to the ground (i.e., with the handle rotated to an angle of approximately 90 degrees with respect to gravity), the electronic processor 305 may set at least one kickback sensitivity parameter to be more sensitive such that driving of the motor 330 is ceased when less kickback is sensed or is ceased more quickly when a trigger release is detected.

As another example of setting a kickback sensitivity parameter based on the orientation of the power tool 102a, the electronic processor 305 may set a filtering method used during the kickback control method based on the orientation of the power tool 102a. For example, when signals are received from the movement sensor 350 that indicate movement in multiple directions, the electronic processor 305 may give more weight to movement in a certain direction depending on the orientation of the power tool 102a (e.g., a direction in which the power tool 102a is likely to move if kickback occurs).

Accordingly, in some embodiments, the electronic processor 305 sets at least one kickback sensitivity parameter based on the pitch of the power tool 102a, the roll of the power tool 102a, or both. In some embodiments, blocks 705 and 710 of FIG. 7 may be repeated such that the electronic processor 305 adjusts at least one kickback sensitivity parameter in a quasi-continuous manner as the orientation of the power tool 102a changes. For example, for every ten degrees that the roll position increases with respect to the initial roll position, the electronic processor 305 may reduce the rotation speed threshold by ten percent to make the electronic processor 305 more sensitive to kickback. In other example embodiments, different degree and threshold adjustment amounts are used.

As indicated above, the electronic processor 305 may establish and/or adjust at least one kickback sensitivity parameter based on the orientation of the power tool 102a. In other words, in some embodiments, the electronic processor 305 performs blocks 705 and 710 in response to the trigger 212 of the power tool 102a being actuated. In such embodiments, the electronic processor 305 establishes a kickback sensitivity parameter (e.g., a rotation speed threshold, a counter threshold, a delay time between monitored angular velocity samples, a working operating angle range, and/or the like) based on an initial orientation of the power tool 102a at a time that the trigger 212 is actuated. For example, each time the trigger 212 is actuated, the electronic processor 305 establishes at least one kickback sensitivity parameter based on an orientation of the power tool 102a as determined using the orientation sensor 345. The relative changes to the kickback sensitivity parameters may be adjusted based on the grip parameters, where the magnitude of the adjustments made based on tool orientation may be reduced for a two-handed or strong grip. Additionally or alternatively, in some embodiments, the electronic processor 305 dynamically updates at least one kickback sensitivity parameter based on a changing orientation of the power tool 102a or grip parameters during operation while the trigger 212 remains actuated. For example, the electronic processor 305 adjusts the rotation speed threshold based on a change in roll position of the power tool 102a during an operation.

At block 715, the electronic processor 305 monitors a power tool characteristic associated with the kickback sensitivity parameter. For example, the power tool characteristic may be one of the power tool characteristics described above such as a motor current, an angular velocity of the power tool 102, a roll position of the power tool 102a, and a position of the trigger 212. In some embodiments, at block 715, the electronic processor 305 monitors more than one power tool characteristic as explained previously, and each power tool characteristic is associated with a kickback sensitivity parameter. At block 720, the electronic processor 305 determines that a kickback of the power tool 102a is occurring based on the monitored power tool characteristic reaching a kickback threshold. In some embodiments, at block 720, the electronic processor 305 determines that kickback of the power tool 102a is occurring based on more than one power tool characteristic meeting its respective kickback threshold. For example, as explained above with respect to FIG. 4, kickback may be determined after both motor current has decreased below a low current threshold and angular velocity exceeds a rotation speed threshold. At block 725, the electronic processor controls the switching network 325 to cease driving of the motor 330 in response to the power tool characteristic reaching the kickback threshold. In some embodiments, blocks 715, 720, and 725 of FIG. 7 are similar to respective blocks 405, 410, and 415 of FIG. 4 and may include similar functionality as that described above with respect to FIG. 4.

Figure 9:
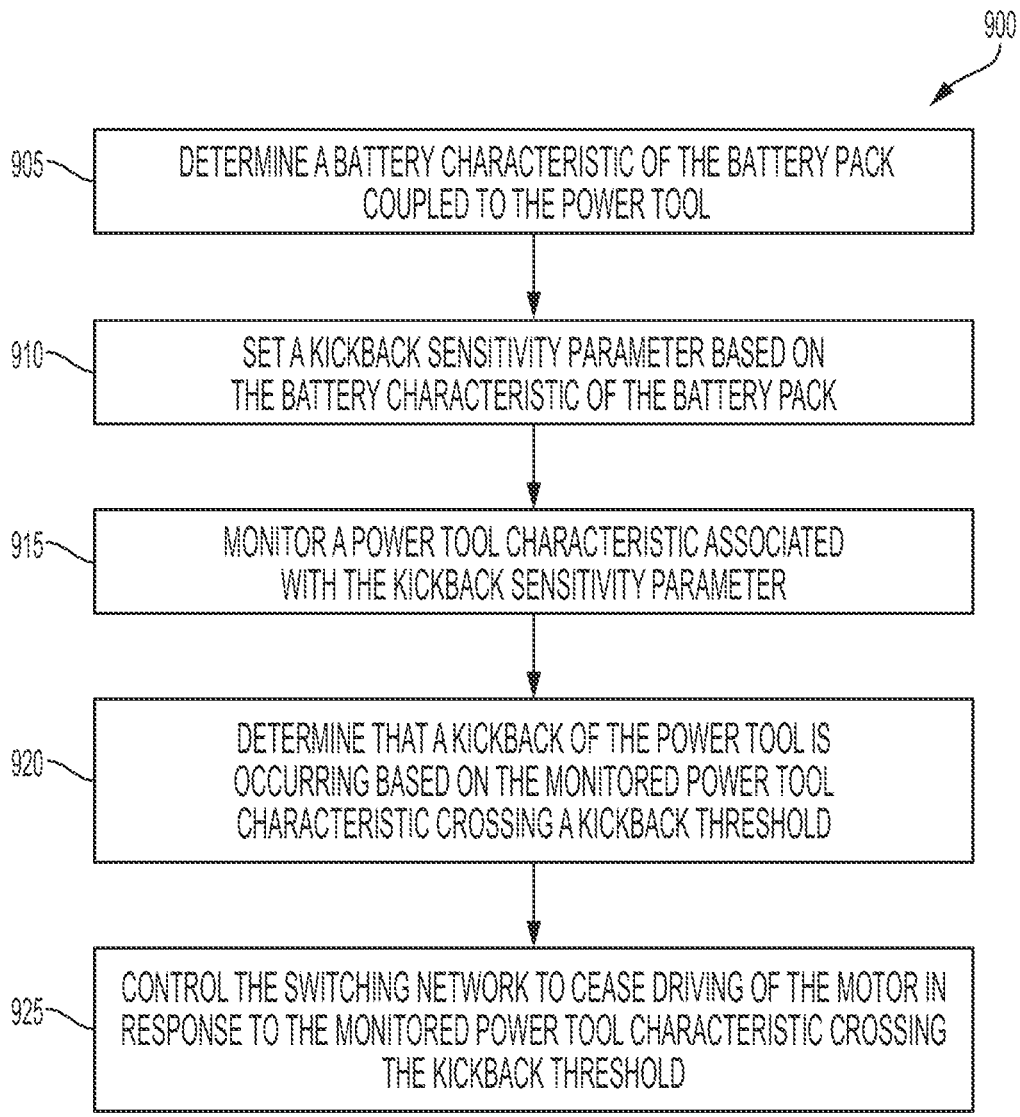
FIG. 9 illustrates a flowchart of an example method of setting a kickback sensitivity parameter based on a battery characteristic of a battery pack coupled to the power tool of FIGS. 2A and 2B.

In some embodiments, the electronic processor 305 establishes and/or adjusts at least one kickback sensitivity parameter based on a battery characteristic of a battery pack coupled to the power tool 102a. FIG. 9 illustrates a flowchart of an example method 900 of setting a kickback sensitivity parameter based on a battery characteristic of a battery pack coupled to the power tool 102a. At block 905, the electronic processor 305 determines a battery characteristic of the battery pack coupled to the power tool 102a. In some embodiments, the electronic processor 305 may receive information from the battery pack (e.g., a battery pack identification, a battery pack type, and the like) and may determine a size or weight of the battery pack using a look-up table stored in the memory 310. In other embodiments, the electronic processor may receive information corresponding to the size or weight of the battery pack from the battery pack.

The remaining blocks of the method 900 (block 910, 915, 920, and 925) are similar to blocks 710, 715, 720, and 725 of FIG. 7. Accordingly, the functions, examples, and alternative embodiments described with respect to these blocks of FIG. 7 also apply to the corresponding blocks of FIG. 9. At block 910, the electronic processor 305 sets a kickback sensitivity parameter based on the battery characteristic of the battery pack. For example, the electronic processor 305 may adjust a rotation speed velocity threshold based on the weight of the battery pack because the weight of the battery pack may affect the rotational inertia of the power tool 102a. At block 915, the electronic processor 305 monitors a power tool characteristic associated with the kickback sensitivity parameter. At block 920, the electronic processor 305 determines that a kickback of the power tool 102a is occurring based on the monitored power tool characteristic reaching a kickback threshold. At block 925, the electronic processor 305 controls the switching network 325 to cease driving of the motor 330 in response to the power tool characteristic reaching the kickback threshold.

Similar to the embodiment described above with respect to FIG. 9, in some embodiments, the electronic processor 305 establishes and/or adjusts at least one kickback sensitivity parameter based on a characteristic of an attachment coupled to the power tool 102a. Such establishment or adjustment may allow the electronic processor 305 to compensate for the effect that the presence of the attachment has on the moment of inertia of the power tool 102a. In addition to a battery pack as described above with respect to FIG. 9, that attachment may be for example, a vacuum system, a side handle, or the like. In some embodiments, the power tool 102a may include a sensor to detect the presence of the attachment or an electronic switch that is actuated when the attachment is mounted to the power tool 102a. In other embodiments, the attachment may include at least one of an electronic processor and a communication device to communicate wirelessly or via a wired connection with the power tool 102a. For example, the attachment may communicate characteristics of the attachment such as an attachment type, an attachment location/position, an attachment weight, and the like to the power tool 102a. In some embodiments, a mode of the power tool 102a may indicate that an attachment is coupled to the power tool 102a. For example, when the power tool 102a is placed in a vacuum mode, the electronic processor 305 determines that a vacuum system is mounted to the power tool 102a. In some embodiments, the electronic processor 305 may determine the presence of an attachment based on information from one or more of the orientation sensor 345 and the movement sensor 350 during minor use or while the power tool 102a is resting. For example, the electronic processor 305 may compare information received from the sensors 345 and 350 with information in a look-up table stored in the memory 310 to determine whether the information from the sensors 345 and 350 indicates that an attachment is mounted on the power tool 102a. Based on at least one of detection of the attachment and receipt of a characteristic of the attachment, the electronic processor 305 may establish and/or adjust at least one kickback sensitivity parameter.

Figure 10:
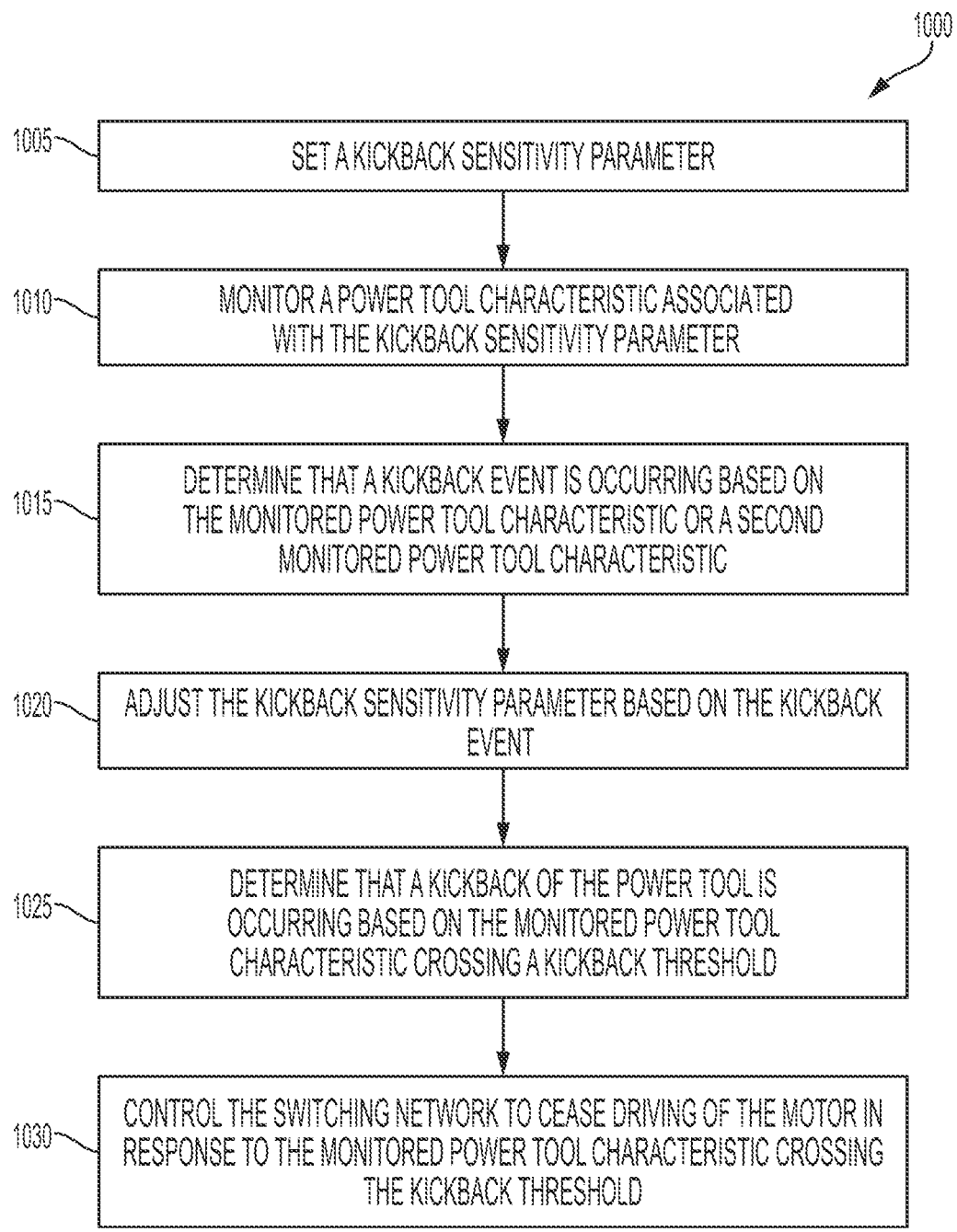
FIG. 10 illustrates a flowchart of an example method of adjusting a kickback sensitivity parameter based on a kickback event of the power tool of FIGS. 2A and 2B.

In some embodiments, the electronic processor 305 adjusts at least one kickback sensitivity parameter based on a kickback event such as a suspected kickback event, a near kickback event, or a detected kickback event. FIG. 10 illustrates a flowchart of an example method 1000 of adjusting a kickback sensitivity parameter based on a kickback event of the power tool 102a. At block 1005, the electronic processor 305 sets a kickback sensitivity parameter (e.g., a kickback threshold or a filtering method as described above). In some embodiments, the electronic processor 305 sets one or more kickback sensitivity parameters based on the orientation of the power tool 102 or the grip parameters as described above.

At block 1010, the electronic processor 305 monitors a power tool characteristic associated with the kickback sensitivity parameter (e.g., at least one of a motor current, an angular velocity of the power tool 102, a trigger position and the like as explained previously). At block 1015, the electronic processor 305 determines that a kickback event is occurring based on the monitored power tool characteristic or a second monitored power tool characteristic. As noted above, the kickback event may be a suspected kickback event, a near kickback event, or a detected kickback event as explained in greater detail below.

In some embodiments, a suspected kickback event is detected when the power tool 102a is initially operated. For example, when the electronic processor 305 determines that the output driver 210 of the power tool 102a moves slower than expected upon start-up, the electronic processor 305 may determine that a kickback event is more likely (e.g., because the bit of the power tool 102a does not have the rotational momentum to overcome small bindings or shear in the workpiece). In some embodiments, a suspected kickback event is detected during operation of the power tool 102a based on a change in roll position of the power tool 102a during operation, which may be referred to as tool walk (see FIG. 12). In some situations, tool walk may indicate a slow loss of control of the power tool 102a by the user. For example, the electronic processor 305 may determine an initial roll position of the power tool when the power tool 102a is initially operated (see block 1205 of FIG. 12). The electronic processor 305 may then monitor the roll position of the power tool 102a during operation and compare the current roll position to the initial roll position (see blocks 1210 and 1215 of FIG. 12). When the current roll position of the power tool 102a has changed a predetermined amount from the initial roll position (i.e., when tool walk has occurred), the electronic processor 305 may determine that a suspected kickback event is occurring.

In some embodiments, a near kickback event is detected when the movement sensor 350 indicates that the housing of the power tool 102a has rotated in such a manner that the monitored angular velocity is within a predetermined amount from the rotation speed threshold (i.e., a second rotation speed threshold that is lower than the rotation speed threshold that indicates kickback of the power tool 102a). In other words, a near kickback event may occur when the output driver 210 of the power tool 102a briefly binds in a workpiece but quickly becomes unbound.

In some embodiments, a detected kickback event occurs when the output of the power tool 102a becomes bound in a workpiece such that the output remains stationary, and the electronic processor 305 controls the switching network 325 to cease driving of the motor 330 (see, for example, the method 400 of FIG. 4).

At block 1020, the electronic processor 305 adjusts the kickback sensitivity parameter based on the kickback event. For example, based on a suspected kickback event (i.e., a detected change in roll position), the electronic processor 305 may decrease the rotation speed threshold and/or increase the trigger release sensitivity to make the power tool 102a more sensitive to kickback (i.e., cease driving of the motor 330 more quickly) because the user may not have full control of the power tool 102a. In some embodiments, the magnitude of the adjustments to the kickback sensitivity parameter may depend on the grip parameters detected by the force sensors 220.

As another example, when a near kickback event is detected, the electronic processor 305 adjusts at least one kickback sensitivity parameter to be less sensitive so as not to falsely detect a kickback (e.g., when the user may have more control of the power tool 102a). In other situations, when a near kickback event is detected, the electronic processor 305 adjusts at least one kickback sensitivity parameter to be more sensitive (e.g., when the user may have less control of the power tool 102a). Accordingly, the adjustment of the kickback sensitivity parameter by the electronic processor 305 (at block 1020) may also take into account the orientation of the power tool 102a in that the user may be determined to have more control when the power tool 102a is at the horizontal orientation 605 or vertically downward orientation 615 than when in the vertically upward orientation 610.

As another example, when a near kickback event is detected (e.g., based on angular velocity of the housing of the power tool 102a exceeding a working operating angle range adjustment threshold), the electronic processor 305 adjusts a working operating angle range as indicated in the method 1600 of FIG. 16 as explained above. In other words, the method 1600 of FIG. 16 is an example of a specific implementation of the method 1000 of FIG. 10 where the electronic processor 305 adjusts a working operating angle range (i.e., a kickback sensitivity parameter) based on monitored angular velocity of the housing of the power tool 102a exceeding a predetermined threshold (i.e., detection of a near kickback event). As explained in the above example with respect to FIG. 16, the electronic processor 305 may decrease the working operating angle range from plus-or-minus fifteen degrees from the initial roll position of the power tool 102a to plus-or-minus ten degrees from the initial roll position of the power tool 102. In this example, the electronic processor 305 adjusts the kickback sensitivity parameter (i.e., the working operating angle range) to be more sensitive to kickback (i.e., cease driving of the motor 330 more quickly) because the angular velocity measurement may indicate that the user does not have full control of the power tool 102a. With respect to this example of decreasing the working operating angle range from plus-or-minus fifteen degrees from the initial roll position of the power tool 102a to plus-or-minus ten degrees from the initial roll position of the power tool 102, the values of the angle range are merely examples and other angle ranges may be used. Additionally, with respect to other example values of and relationships between speeds, angles, thresholds, ranges, and the like throughout this description, these values and relationships are merely examples and other values and relationships are possible in other situations and embodiments.

In some embodiments, the electronic processor 305 may keep track of the number of kickback events that have occurred, for example, using the memory 310. In some embodiments, the electronic processor 305 may adjust at least one kickback sensitivity parameter based on a predetermined number of kickback events occurring. For example, the electronic processor 305 may decrease the sensitivity of a kickback threshold after three detected kickback events to prevent the motor 330 from being shut down so often during use. Further, in such embodiments, the electronic processor 305 may adjust at least one kickback sensitivity parameter based on a predetermined number of kickback events occurring within a predetermined period of time (e.g., thirty seconds). For example, the electronic processor 305 may decrease the sensitivity of a kickback threshold when three detected kickback events occur within thirty seconds.

In some embodiments, the kickback events may be detected during a single, continuous operation of the power tool 102a (i.e., during a single trigger actuation before the trigger 212 is released). However, in other embodiments, these kickback events may be detected over multiple trigger actuations. In both embodiments, the electronic processor 305 may store the number of kickback events in the memory 310 and may adjust at least one kickback sensitivity parameter based on a predetermined number of occurrences of one or more of these events. For example, when three near kickback events are detected, the electronic processor 305 may adjust the rotation speed threshold of the power tool 102a.

In some embodiments, the electronic processor 305 may store kickback sensitivity parameters used during previous operating modes of the power tool 102a (i.e., a history of modes selected by the user and corresponding history of kickback sensitivity parameters used during the modes). When the power tool 102a switches modes, the electronic processor 305 may adjust at least one kickback sensitivity parameter based on a selected mode of the power tool 102a to, for example, correspond to a kickback sensitivity parameter that was previously used during the selected mode.

In some embodiments, blocks 1010, 1015, and 1020 of the method 1000 are repeated such that one or more kickback sensitivity parameters are adjusted more than once as kickback events are detected by the electronic processor 305.

The remaining blocks of the method 1000 (block 1025 and 1030) are similar to blocks 720 and 725 of FIG. 7. Accordingly, the functions, examples, and alternative embodiments described with respect to these blocks of FIG. 7 also apply to the corresponding blocks of FIG. 10. At block 1025, the electronic processor 305 determines that a kickback of the power tool is occurring based the monitored power tool characteristic reaching a kickback threshold. At block 1030, the electronic processor 305 controls the switching network to cease driving of the motor 330 in response to the monitored power tool characteristic reaching the kickback threshold.

In some embodiments, the electronic processor 305 is configured to establish or adjust at least one kickback sensitivity parameter during a start-up of the power tool 102a. For example, the power tool 102a may be more likely to experience kickback when the motor 330 is being started from a standstill than when the motor 330 is already moving and has some rotational momentum. In such situations when the electronic processor 305 determines that the motor 330 is starting from a standstill, the electronic processor 305 may set at least one kickback sensitivity parameter to be less sensitive to allow the power tool 102a to power through minor kickback caused by small bindings or shear in the workpiece (e.g., when the orientation of the power tool 102a indicates that the power tool 102a is in a well-controlled position). Alternatively, the electronic processor 305 may set at least one kickback sensitivity parameter to be more sensitive to attempt to cease providing power to the motor 330 when even minor kickback is detected (e.g., when the orientation of the power tool 102a indicates that the power tool 102a is in a less-controlled position). In some embodiments, after the motor 330 has reached a desired operating speed, the electronic processor 305 may further adjust at least one kickback sensitivity parameter. In some embodiments, the electronic processor 305 may be configured to adjust at least one kickback sensitivity parameter in a quasi-continuous manner as the speed of the motor 330 changes. For example, as the speed of the motor 330 increases from a standstill to a desired operating speed, the electronic processor 305 may gradually increase or decrease at least one kickback sensitivity parameter.

Figure 11:
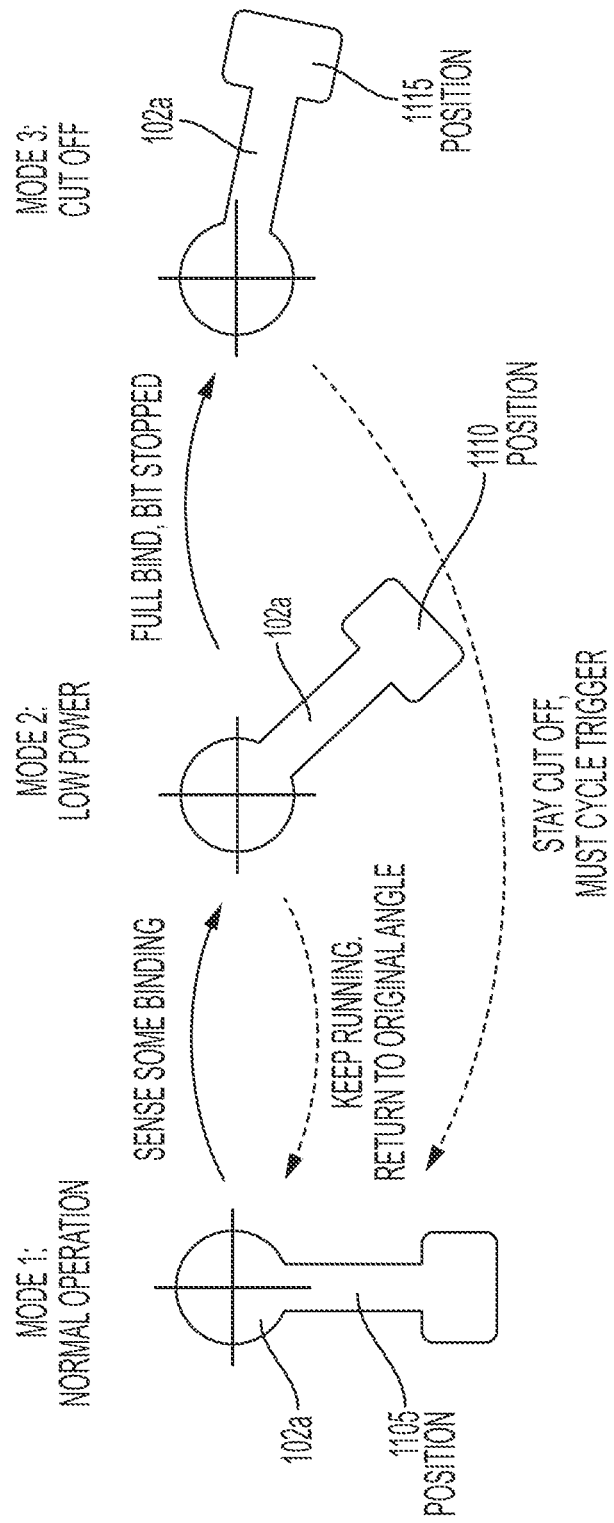
FIG. 11 illustrates three example roll positions of the power tool of FIGS. 2A and 2B.

FIG. 11 illustrates three example roll positions of the power tool 102a. Position 1105 represents the initial position of the power tool 102a when the trigger 212 is pulled to begin operation on a workpiece. In this example situation, the power tool 102a is being used in a horizontal position and is vertically upright with a roll position of approximately zero degrees with respect to gravity. At position 1110, the power tool 102a has rotated due to minor binding with the workpiece (i.e., tool walk has occurred). At position 1115, the output of the power tool 102a has become bound in the workpiece and a kickback has occurred.

In some embodiments, the electronic processor 305 reduces the power supplied to the motor 330 when tool walk is detected. Such power reduction may indicate to the user that the roll position of the power tool 102a has changed during operation (position 1110 of FIG. 11). In some embodiments, if the user corrects the roll position to, for example, correspond with the initial roll position of the power tool 102a (position 1105 of FIG. 11), the electronic processor 305 may allow full power to be supplied to the motor 330 in accordance with the position of the trigger 212. In some embodiments, if the force sensors 220 detect that the user has changed to a two-handed grip or stronger grip, the electronic processor 305 may allow full power to be supplied to the motor 330 in accordance with the position of the trigger 212.

Figure 12:
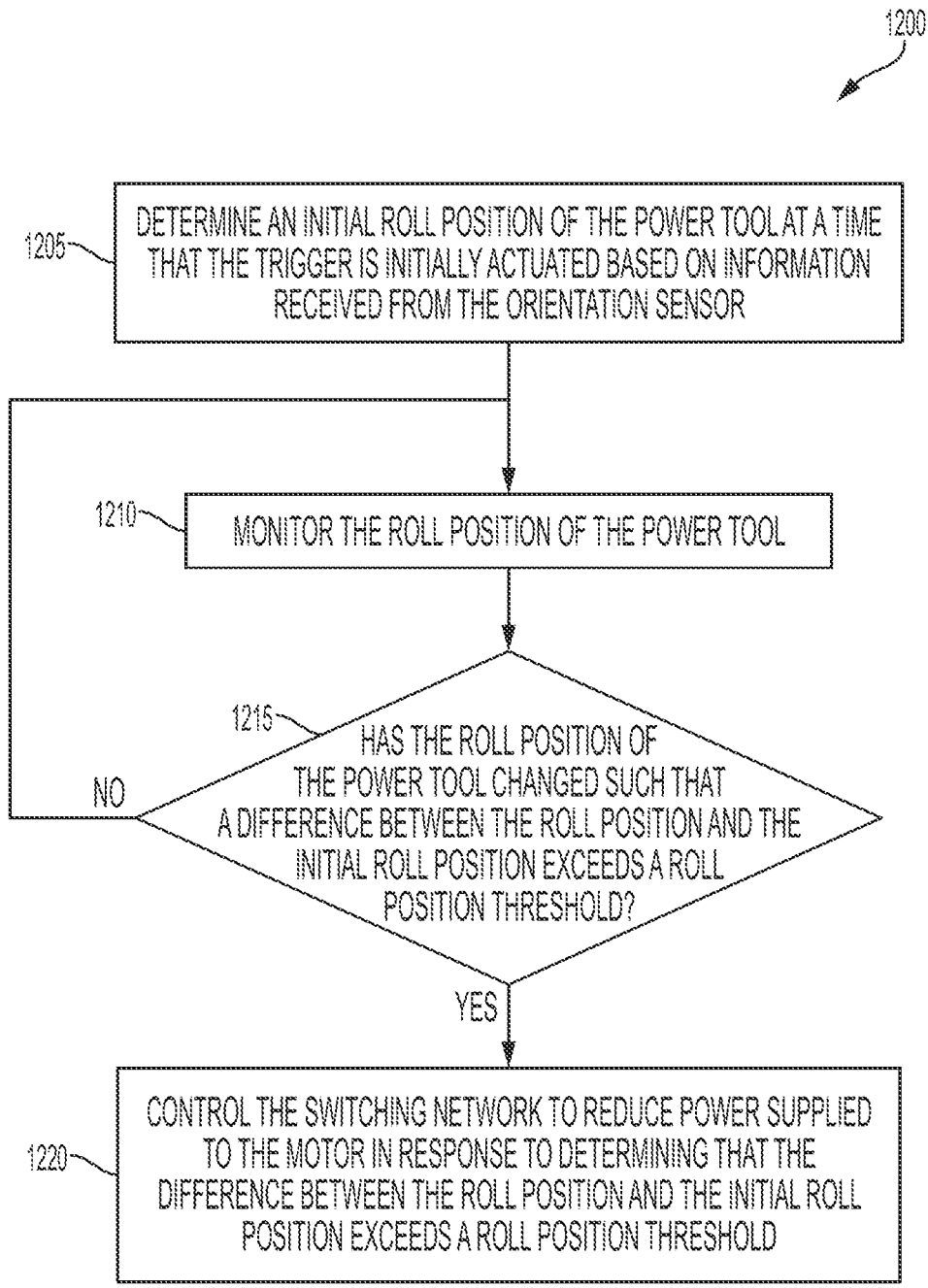
FIG. 12 illustrates a flowchart of an example method of reducing power supplied to the motor of the power tool of FIGS. 2A and 2B based on detected tool walk of the power tool.

FIG. 12 illustrates a flowchart of an example method 1200 of reducing power supplied to the motor 330 based on detected tool walk of the power tool 102a. At block 1205, the electronic processor 305 determines an initial roll position of the power tool 102a (e.g., with respect to gravity) at a time that the trigger 212 is initially actuated based on information received from the orientation sensor 345 (e.g., position 1105 of FIG. 11). The electronic processor 305 may store the information related to the initial roll position in the memory 310.

At block 1210, the electronic processor 305 monitors the roll position of the power tool 102a. At block 1215, the electronic processor 305 determines whether the roll position of the power tool 102a has changed such that a difference between the roll position and the initial roll position exceeds a roll position threshold. In some embodiments, the roll position threshold is a predetermined number of degrees from the initial roll position. Additionally or alternatively, the roll position threshold may be a predetermined number of degrees with respect to a desired operation position (e.g., during horizontal operation, a tool walk that results in a tool position of 70 degrees in either direction with respect to gravity). When the electronic processor 305 determines that the difference between the roll position and the initial roll position has not reached the roll position threshold, the method 1200 proceeds back to block 1210 to continue monitoring the roll position of the power tool 102a.

When the electronic processor 305 determines that the difference between the roll position and the initial roll position exceeds the roll position threshold (e.g., position 1110 of FIG. 11), at block 1220, the electronic processor 305 controls the switching network 325 to reduce power supplied to the motor 330 in response to determining that the difference between the roll position and the initial roll position exceeds the roll position threshold. In some embodiments, the roll position threshold is not a single, discrete threshold. Rather, the electronic processor 305 may adjust the power supplied to the motor 330 in a quasi-continuous manner based on the roll position of the power tool 102a as the roll position changes. For example, for every ten degrees that the roll position increases with respect to the initial roll position, the electronic processor 305 may reduce the speed of the motor 330 by twenty percent.

As mentioned above, the reduction in power that occurs at block 1220 may notify the user that tool walk has occurred. In some embodiments, if the user corrects the roll position to, for example, correspond with the initial roll position of the power tool 102a, the electronic processor 305 may allow full power to be supplied to the motor 330 in accordance with the position of the trigger 212. In such embodiments, the electronic processor 305 may gradually increase power supplied to the motor 330 to full power (e.g., using a time delay). Similar to the reduction of power described above, the restoration of power as the roll position of the power tool 102a is corrected may be provided in a quasi-continuous manner. Additionally, in some embodiments, the electronic processor 305 may require the roll position of the power tool 102a to correspond to a desired roll position (e.g., during horizontal operation, a vertically upright tool with a tool position of approximately zero degrees with respect to gravity) to re-allow full power to be supplied to the motor 330 rather than restoring full power to the motor 330 when the power tool is re-oriented to an initial roll position. In some embodiments, the electronic processor 305 may restore full or partial power to the motor 330 in response to the roll position of the power tool 102a being corrected to be within a predetermined amount from the initial roll position or from a desired roll position. In other words, the electronic processor 305 may restore full or partial power to the motor 330 when the roll position of the power tool 102a has been partially, but not completely, corrected.

In some embodiments, the electronic processor 305 executes the method 1200 in conjunction with one of the previously described methods such that the electronic processor 305 may detect a kickback of the power tool 102a and cease driving of the motor 330 during execution of the method 1200. Additionally, the electronic processor 305 may adjust a kickback sensitivity parameter based on detected tool walk as explained in detail above with respect to FIG. 10.

In another embodiment of FIG. 12, at block 1215, the electronic processor 305 may proceed to block 1220 to reduce power supplied to the motor 330 in response to the roll position of the power tool 102a exceeding a predetermined roll position threshold. In such embodiments, the electronic processor 305 may not determine the difference between the roll position and an initial roll position. Rather, the electronic processor 305 reduces the power supplied to the motor 330 based on merely the roll position of the power tool 102. For example, the electronic processor 305 may reduce the power supplied to the motor 330 in response to determining that the roll position of the power tool 102*a* is horizontal with respect to the ground (i.e., with the handle rotated to an angle of approximately 90 degrees with respect to gravity).

When kickback of the power tool 102*a* occurs, the power tool 102*a* may remain bound in the workpiece at an awkward angle such that it is difficult for the user to grasp or operate the power tool 102*a*. Often, a user will attempt to unbind the power tool 102*a* by applying force to the housing of the power tool 102*a* to manually rotate the housing and the output driver 210 of the power tool 102*a*. However, the user may not be able to apply enough force to unbind the power tool 102*a*, and if the power tool 102*a* becomes unbound, it may move/swing quickly due to the force applied by the user. In other instances, to attempt to unbind the power tool 102*a*, a user may switch the rotational direction of the motor 330 of the power tool 102*a* and operate the power tool 102*a* in a reverse mode. However, this also may cause the power tool 102*a* to move/swing quickly after the power tool 102*a* becomes unbound.

Figure 13:
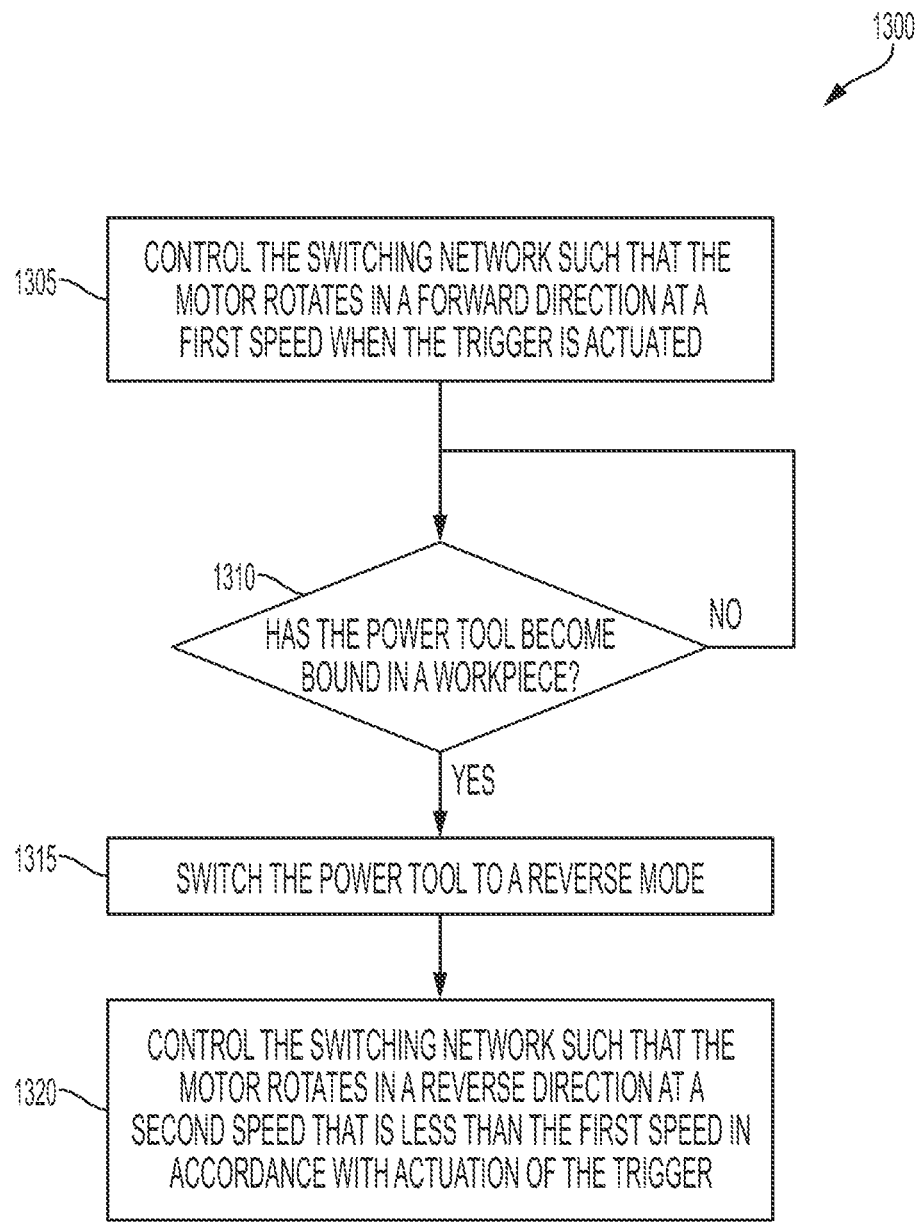
FIGS. 13 and 14 illustrate flowcharts of example methods of controlling the power tool of FIGS. 2A and 2B after the power tool 102a becomes bound in a workpiece.

FIG. 13 illustrates a flowchart of a method 1300 of controlling the power tool 102*a* after the power tool 102*a* becomes bound in a workpiece. The method 1300 allows the housing of the power tool 102*a* to return to a desired position such that the user can attempt to unbind the power tool 102*a*. In some situations, the power tool 102*a* may become unbound during execution of the method 1300. In some embodiments, the method 1300 allows the housing of the power tool 102*a* to move slowly in the reverse direction to prevent the quick movements/swings mentioned above with respect to other methods of unbinding of the power tool 102*a*.

At block 1305, the electronic processor 305 controls the switching network 325 such that the motor 330 rotates in a forward direction at a first speed when the trigger 212 is actuated. At block 1310, the electronic processor 305 determines whether the power tool 102*a* has become bound in a workpiece. For example, when the electronic processor 305 ceases driving the motor 330 in response to a monitored power tool characteristic reaching a kickback threshold, the electronic processor 305 may determine that the power tool 102 has become bound in a workpiece. When the power tool 102*a* has not become bound in a workpiece, the method 1300 remains at block 1310 and the electronic processor 305 continues to control the switching network 325 such that the motor 330 rotates in a forward direction at the first speed in accordance with actuation of the trigger 212.

When the electronic processor 305 has determined that the power tool 102*a* has become bound in the workpiece (at block 1310), at block 1315, the electronic processor 305 switches the power tool 102*a* to a reverse mode. In some embodiments, this switch to a reverse mode may be caused by the user actuating the forward/reverse selector 219. In other embodiments, the electronic processor 305 switches the power tool 102*a* to reverse mode without requiring the user to actuate the forward/reverse selector 219. In other words, the electronic processor 305 switches the power tool 102*a* to reverse mode in response to determining that the power tool 102*a* has become bound in a workpiece.

At block 1320, the electronic processor 305 controls the switching network 325 such that the motor 330 rotates in a reverse direction at a second speed that is less than the first speed in accordance with actuation of the trigger 212 (e.g., at a speed that is less than a predetermined reversal speed). For example, the electronic processor 305 may control the motor 330 in this manner in response to the trigger 212 being actuated after the power tool 102*a* has become bound in a workpiece. In other words, the electronic processor 305 may not execute block 1320 until the user actuates the trigger 212. Because the output driver 210 is bound in the workpiece and unable to rotate, the slow reverse rotation of the motor 330 allows the housing of power tool 102*a* to return to a desired position without swinging/moving the power tool 102*a* too quickly. In some embodiments, the electronic processor 305 sets the second speed as a single speed of the motor 330 regardless of the distance that the trigger 212 is actuated. In other embodiments, the electronic processor 305 sets the second speed as a maximum speed of the motor 330 and allows the user to operate the motor 330 at slower speeds by actuating the trigger 212 less than the maximum distance. In some embodiments, the second speed is a predetermined percent reduction of the first speed. In some embodiments, the second speed of the motor 330 may start near the first speed and gradually ramp downward until it reaches a predetermined level.

When the electronic processor 305 determines that the trigger 212 is no longer actuated, the electronic processor 305 controls the switching network 325 to cease driving the motor 330. In embodiments where the switch to reverse mode (at block 1315) was caused by the user actuating the forward/reverse selector 219, the electronic processor 305 keeps the power tool 102*a* in reverse mode but may not limit the speed of the motor 330 the next time the trigger is actuated. In other words, the next time the trigger 212 is actuated, the power tool 102*a* may operate at full reverse speed in accordance with the actuation of the trigger 212. On the other hand, in embodiments where the electronic processor 305 switched the power tool 102*a* to reverse mode without requiring the user to actuate the forward/reverse selector 219 (at block 1315), the electronic processor 305 may switch the power tool 102*a* back to forward mode. In such embodiments, the next time the trigger 212 is actuated, the power tool 102*a* may operate at full forward speed in accordance with the actuation of the trigger 212. In one or both of these embodiments, the electronic processor 305 may control the speed of the motor 330 to gradually increase speed to allow the user to realize the direction and speed in which the motor 330 is set to operate.

Figure 14:
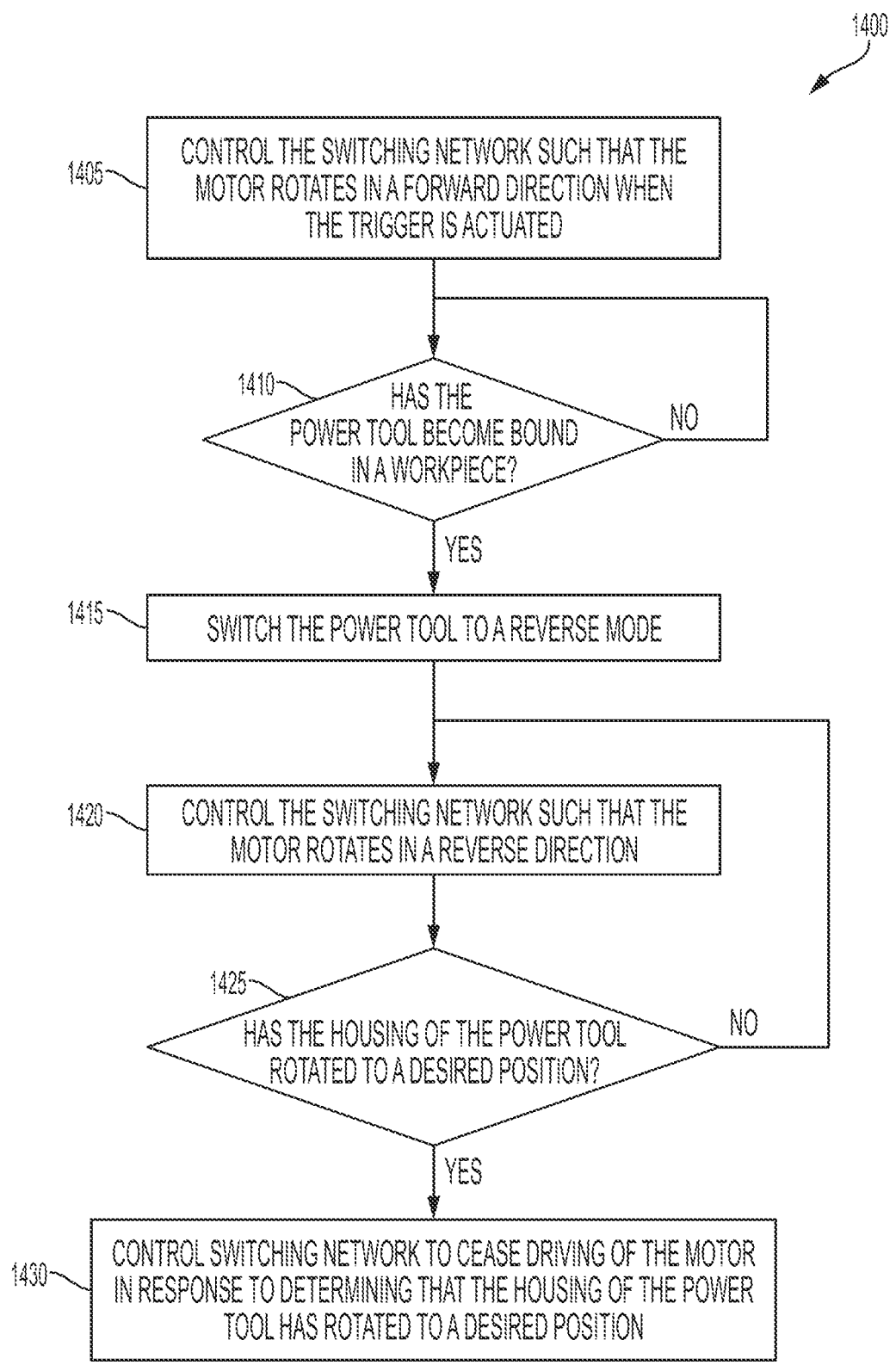

FIG. 14 illustrates a flowchart of another method of controlling the power tool 102*a* after the power tool 102*a* become bound in a workpiece. Blocks 1405, 1410, and 1415 are similar to blocks 1305, 1310, and 1315 of the method 1300 of FIG. 13 explained above such that the electronic processor 305 switches the power tool 102*a* to a reverse mode when the power tool 102*a* has become bound in a workpiece.

At block 1420, the electronic processor 305 controls the switching network 325 such that the motor 330 rotates in a reverse direction. In some embodiments, the electronic processor 305 controls the motor 330 to rotate in the reverse direction without requiring any user action (i.e., auto-reverse). For example, the electronic processor 305 may control the motor 330 to rotate in the reverse direction in response to determining that the power tool 102*a* has become bound in the workpiece. In some embodiments, the electronic processor 305 may control the motor 330 to rotate in the reverse direction after a predetermined time has elapsed since the electronic processor 305 has determined that the power tool 102*a* has become bound in the workpiece (e.g., three seconds, one second, 200 milliseconds, and the like). In some embodiments, the electronic processor 305 controls the motor 330 to rotate at a predetermined speed that is similar to the second speed described above with respect to block 1320 of FIG. 13.

In other embodiments, the electronic processor 305 controls the motor 330 to rotate in the reverse direction in response to detecting that the user applied a force to the power tool 102a in the reverse direction (i.e., user-assist reverse). For example, when the power tool 102a becomes bound in the workpiece, the electronic processor 305 determines the rotational position of the motor 330 and the position of the power tool 102a about the rotational axis 211. In some embodiments, the power tool 102a has a clutch that allows for the housing of the power tool 102a to be slightly manually rotated (e.g., 10-15 degrees) with respect to the output driver 210 when the output driver 210 is bound in the workpiece. Such a characteristic is referred to as "play in the clutch" and may be monitored by the electronic processor 305 using, for example, the orientation sensor 345 and the Hall sensors 335. For example, based on values received from these sensors the electronic processor may determine a difference between a position of the shaft of the motor 330 and a position of the housing of the power tool 102a. By continuing to monitor the rotational position of the motor 330 and the position of the power tool 102a with respect to the rotational axis 211 after the power tool 102a has become bound in the workpiece, the electronic processor 305 is able to determine whether a force is being applied to the power tool 102a by the user. The force may be recognized by the electronic processor 305 when the position of the housing of the power tool 102a with respect to the rotational axis 211 changes relative to the rotational position of the motor 330 above a certain threshold (e.g., 10 or 15 degrees), which may be realized by manual rotation of the housing due to the play in the clutch. Accordingly, in some embodiments, when the electronic processor 305 determines that a force is being applied to the power tool 102a in a reverse direction, the electronic processor 305 controls the motor 330 to rotate in the reverse direction. Such reverse rotation of the motor 330 may allow the user to rotate the housing of the power tool 102a to return to a desired position while the output driver 210 remains bound in the workpiece and unable to rotate. In some embodiments, the speed at which the motor 330 rotates in the reverse direction depends on the amount in which the power tool 102a is rotated within the play in the clutch.

While the motor 330 of the power tool 102a is rotating in the reverse direction, at block 1425, the electronic processor 305 determines whether the housing of the power tool 102a has rotated to a desired position. For example, the electronic processor 305 may compare the roll position of the power tool 102a to the initial roll position as described above. As another example, the electronic processor 305 may compare the roll position of the power tool 102a to a preferred roll position (e.g., during horizontal operation, a vertically upright tool with a tool position of approximately zero degrees with respect to gravity). In some embodiments, the electronic processor 305 may determine that a desired position has been reached when the housing of the power tool 102a has rotated a predetermined number of degrees from a bound roll position. In other words, the electronic processor 305 may compare a bound roll position of the power tool 102a at a time immediately after the power tool 102a became bound in the workpiece to a current roll position. In some embodiments, a desired position may be indicated by the electronic processor 305 determining that the user is applying a force to the power tool 102a to stop the reverse rotation of the motor 330. For example, the electronic processor 305 may determine that the motor current has increased above a predetermined threshold (e.g., to attempt to overcome the force provided by the user to stop the power tool 102a from rotating in the reverse direction).

Along similar lines, in some embodiments, a desired position may be indicated by the electronic processor 305 determining that the position of the housing of the power tool 102a with respect to the rotational axis 211 changes relative to the rotational position of the motor 330 above a certain threshold (e.g., 10 or 15 degrees). This relative change may be realized by manual rotation of the housing, due to the play in the clutch, in a direction opposite the rotation of the housing being caused by the motor 330. In some embodiments, the electronic processor 305 determines that a desired position has been reached when the electronic processor 305 determines that the output driver 210 is no longer bound in the workpiece. For example, a drop in motor current (e.g., below a threshold) may indicate that the output driver 210 is no longer bound in the workpiece. In some embodiments, the electronic processor 305 may determine that a desired position has been reached when the trigger 212 is actuated or when some other switch/button on the power tool 102a is actuated (i.e., the user attempts to use the power tool 102a again because the housing of the power tool 102a has rotated to a desired position of the user).

When the housing of the power tool 102a has not rotated to a desired position, the method 1400 proceeds back to block 1420 to continue controlling the motor 330 to slowly rotate in the reverse direction. When the housing of the power tool 102a has rotated to a desired position, at block 1430, the electronic processor 305 controls the switching network 325 to cease driving of the motor 330 in response to determining that the housing of the power tool 102a has rotated to a desired position.

Similar to the description of the method 1400 above, in embodiments where the switch to reverse mode (at block 1415) was caused by the user actuating the forward/reverse selector 219, the electronic processor 305 keeps the power tool 102a in reverse mode but may not limit the speed of the motor 330 the next time the trigger is actuated. In other words, the next time the trigger 212 is actuated, the power tool 102a may operate at full reverse speed in accordance with the actuation of the trigger 212. On the other hand, in embodiments where the electronic processor 305 switched the power tool 102a to reverse mode without requiring the user to actuate the forward/reverse selector 219 (at block 1115), the electronic processor 305 may switch the power tool 102a back to forward mode. In such embodiments, the next time the trigger 212 is actuated, the power tool 102a may operate at full forward speed in accordance with the actuation of the trigger 212. In one or both of these embodiments, the electronic processor 305 may control the speed of the motor 330 to gradually increase speed to allow the user to realize the direction and speed in which the motor 330 is set to operate.

In some embodiments, any of the previously-explained kickback control features and methods may be optionally executed by the electronic processor 305 based on instructions received from the external device 108. For example, the graphical user interface 505 may include additional toggle switches to allow the user to select which kickback control features and methods should be implemented as well as the kickback sensitivity parameters of each kickback control feature or method. For example, the graphical user interface 505 may receive an indication of whether to enable adjustment of kickback sensitivity parameters based on at least one of orientation of the power tool 102a (FIG. 7), a battery characteristic of the battery pack coupled to the power tool 102a (FIG. 9), and kickback events (FIG. 10). The graphical user interface 505 may also receive an indication from the user of whether to enable power reduction based on tool walk (FIG. 12) or whether to enable one of the reverse rotation methods of FIGS. 13 and 14 when the power tool 102a becomes bound in a workpiece.

Figure 17:
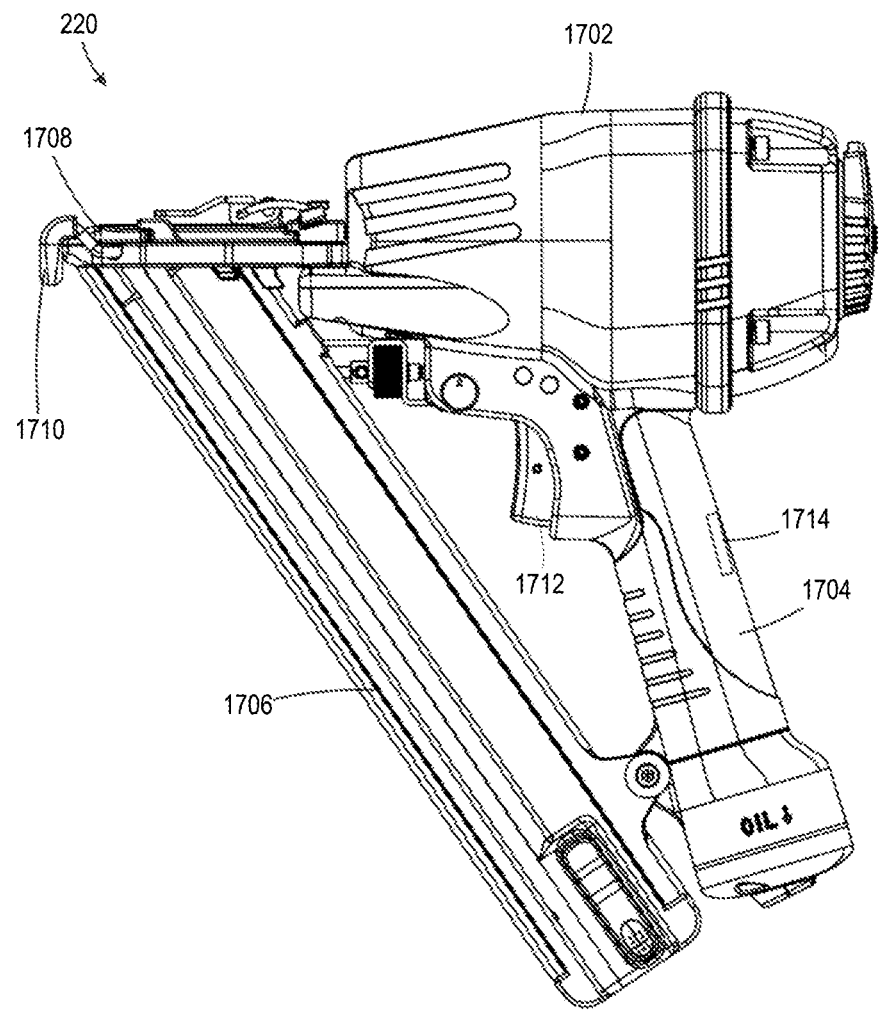
FIG. 17 illustrate an example power tool of the communication system of FIG. 1 according to another example embodiment.

FIG. 17 illustrate another power tool 1700. In the embodiment shown in FIG. 17, the power tool 1700 is a nailer. In other embodiments, the power tool 1700 is a stapler, a drywall gun, etc. As shown in FIG. 17, the power tool 1700 includes an upper main body 1702, a handle 1704, a fastener magazine 1706, a nose portion 1708, a nose sensor 1710, a trigger 1712, and a grip sensor 1714. In some embodiments, a battery pack is interfaced with (e.g., removably securable to) the power tool 1700. The fastener magazine 1706 is configured to receive a plurality of fastening devices (e.g., nails, staples, brads, etc.).

In some embodiments, the nose sensor 1710 is a pressure sensor that does not substantially move when the user presses the nose portion 1708 against a surface (e.g., the surface to which a fastener is to be applied). In some embodiments, the trigger 1712 is a pressure sensor that does not substantially move when the user presses the trigger 1712. The language of pressing or depressing the trigger 1712, as used herein, does not imply motion of the trigger 1712.

The nose sensor 1710 and the trigger 1712 are associated with a fastener firing portion of the power tool 1700. The nose sensor 1710 is activated when, for example, the nose portion 1708 of the power tool 1700 is pressed against a surface. The activation of the nose sensor 1710 results in an electrical signal being provided to a controller of the power tool 1700. The nose sensor 1710 is provided to, for example, assist in preventing a fastener from being fired when the power tool 1700 is in a non-use position (e.g., not pressed against a surface). In a bump mode of operation, the trigger 1712 may be held by the user in an activated state, and the power tool 1700 may fire a fastener responsive to an activation of the nose sensor 1710. In a single fire mode of operation, the power tool 1700 is be placed in contact with the surface to activate the nose switch 1710, and the trigger 1712 is activated to fire the fastener.

In some embodiments, a sensor such as the nose sensor 1710 of the power tool 1700 is used in other locations or for controlling other features of the power tool 1700. For example, the force or pressure sensor used in the nose portion 1708 could also be used as a mode select button for the power tool 1700, as a battery gauge button (e.g., to cause a battery pack state of charge to be displayed), or as a user interface for a device (e.g., a radio, a vacuum cleaner, lights, etc.). For example, the force or pressure sensor would enable multi-function pressing depending upon how hard or soft the sensor is pressed.

The grip sensor 1714 is used to provide a signal indicating the user is holding handle portion 1704 of the power tool 1700. In some embodiments, the grip sensor 1714 is a touch sensor (e.g., a capacitive touch sensor) that generates a binary signal upon activation. In other embodiments, the grip sensor 1714 is a force or pressure sensor that provides a signal proportional to the strength of the user's grip.

Thus, the invention provides, among other things, a power tool with various kickback control features and a power tool with at least one force sensor.

We claim:

1. A power tool comprising:
a housing having a motor housing portion, a handle portion, and a battery pack interface;
a motor within the motor housing portion and having a rotor and a stator, the rotor configured to rotationally drive a motor shaft about a rotational axis;
a trigger configured to be actuated to cause the power tool to drive the motor;
at least one grip sensor supported by the housing and configured to generate a grip parameter, wherein the grip parameter represents a user grip on the housing;
a switching network electrically coupled to the motor; and
an electronic processor connected to the switching network and the at least one grip sensor, the electronic processor configured to implement kickback control of the power tool, wherein, to implement the kickback control, the electronic processor is configured to:
determine a kickback threshold based on the grip parameter,
control, in response to the trigger being actuated, the switching network to drive the motor,
receive a signal related to a power tool characteristic,
determine, based on the power tool characteristic being greater than or equal to the kickback threshold, that a kickback event of the power tool is occurring, and
control, in response to determining that the kickback event is occurring, the switching network to cease driving of the motor.

2. The power tool of claim 1, wherein the power tool characteristic includes a measurement of an angular velocity of the housing of the power tool received at time intervals, and the electronic processor is configured to:
receive, within a first time period, a plurality of measurements of the angular velocity of the housing of the power tool,
determine whether each measurement of the angular velocity is greater than or equal to the kickback threshold,
increment a counter for each measurement of the angular velocity that is determined to be greater than or equal to the kickback threshold,
determine that the counter is greater than or equal to a counter threshold, and
control, in response to determining that the counter is greater than or equal to the counter threshold, the switching network to cease driving of the motor.

3. The power tool of claim 1, wherein:
the at least one grip sensor includes a first grip sensor supported by the handle portion and a second grip sensor supported by the motor housing portion; and
the grip parameter includes an indication of a one-handed grip or a two-handed grip.

4. The power tool of claim 3, wherein:
the kickback threshold is a first threshold when the grip parameter indicates the one-handed grip;
the kickback threshold is a second threshold when the grip parameter indicates the two-handed grip; and
the second threshold is greater than the first threshold.

5. The power tool of claim 3, wherein:
the at least one grip sensor includes a pressure sensor; and
the grip parameter indicates a grip strength.

6. The power tool of claim 5, wherein the power tool is prevented from being operated unless the grip strength is a non-zero value.

7. The power tool of claim 1, wherein:
the power tool characteristic is a first power tool characteristic;
the kickback threshold is a first kickback threshold; and
the electronic processor is configured to:
monitor, in response to the first power tool characteristic being greater than or equal to the first kickback threshold, a second power tool characteristic, and
determine that the kickback event is occurring based on the second power tool characteristic being greater than or equal to a second kickback threshold.

8. The power tool of claim 7, wherein:
the first monitored power tool characteristic is a motor current; and
the second power tool characteristic is a rotation speed of the housing.

9. A method for kickback control of a power tool having a housing, the method comprising:
determining, with an electronic processor, a kickback threshold based on a grip parameter, the grip parameter provided by at least one grip sensor supported by the housing and configured to generate a grip parameter, wherein the grip parameter represents a user grip on the housing;
controlling, in response to a trigger being actuated and with the electronic processor, a switching network to drive a motor, wherein the motor is housed within a motor housing portion of the housing and having a rotor and a stator, wherein the rotor is configured to rotationally drive a motor shaft about a rotational axis, and wherein the switching network is electrically coupled to the motor;
receiving, with the electronic processor, a signal related to a power tool characteristic;
determining, based on the power tool characteristic being greater than or equal to the kickback threshold and with the electronic processor, that a kickback event of the power tool is occurring; and
controlling, in response to determining that the kickback event is occurring and with the electronic processor, the switching network to cease driving of the motor.

10. The method of claim 9, wherein the power tool characteristic includes a measurement of an angular velocity of the housing of the power tool received at time intervals, and the method further includes:
receiving, within a first time period and with the electronic processor, a plurality of measurements of the angular velocity of the housing of the power tool;
determining, with the electronic processor, whether each measurement of the angular velocity is greater than or equal to the kickback threshold;
incrementing, with the electronic processor, a counter for each measurement of the angular velocity that is determined to be greater than or equal to the kickback threshold;
determining, with the electronic processor, that the counter is greater than or equal to a counter threshold; and
controlling, in response to determining that the counter is greater than or equal to the counter threshold and with the electronic processor, the switching network to cease driving of the motor.

11. The method of claim 9, wherein the at least one grip sensor includes a first grip sensor supported by the handle portion and a second grip sensor supported by the motor housing portion, wherein the grip parameter includes an indication of a one-handed grip or a two-handed grip.

12. The method of claim 11, wherein the kickback threshold is a first threshold when the grip parameter indicates the one-handed grip, wherein the kickback threshold is a second threshold when the grip parameter indicates a two-handed grip, and wherein the second threshold is greater than the first threshold.

13. The method of claim 11, wherein the at least one grip sensor includes a pressure sensor, and the grip parameter indicates a grip strength.

14. The method of claim 13, wherein the power tool is prevented from being operated unless the grip strength is a non-zero value.

15. The method of claim 9, wherein the power tool characteristic is a first power tool characteristic, wherein the kickback threshold is a first kickback threshold, and wherein the method further includes:
monitoring, in response to the first power tool characteristic being greater than or equal to the first kickback threshold and with the electronic processor, a second power tool characteristic; and
determining, with the electronic processor, that the kickback of the power tool is occurring based on the second power tool characteristic being greater than or equal to a second kickback threshold.

16. The method of claim 15, wherein the first monitored power tool characteristic is a motor current, and wherein the second power tool characteristic is a rotation speed of the housing.

17. A power tool comprising:
a housing having a motor housing portion, a handle portion, and a battery pack interface;
a motor within the motor housing portion and having a rotor and a stator, the rotor configured to rotationally drive a motor shaft about a rotational axis;
a trigger configured to be actuated to cause the power tool to drive the motor;
a first grip sensor supported by the handle portion and a second grip sensor supported by the motor housing portion, the first grip sensor and the second grip sensor configured to be used to generate a grip parameter, the grip parameter including an indication of a one-handed grip or a two-handed grip;
a switching network electrically coupled to the motor; and
an electronic processor connected to the switching network and the at least one grip sensor, the electronic processor configured to:
select one of a first threshold and a second threshold based on the grip parameter, wherein the first threshold is selected when the grip parameter indicates the one-handed grip, and wherein the second threshold is selected when the grip parameter indicates the two-handed grip,
receive a signal related to a power tool characteristic, and
control, in response to whether the power tool characteristic is greater than or equal to the selected one of the first threshold and the second threshold and in response to the trigger being actuated, the switching network to control driving of the motor.

18. The power tool of claim 17, wherein the second threshold is greater than the first threshold.

19. The power tool of claim 17, wherein the grip parameter indicates a grip strength, and wherein the power tool is prevented from being operated unless the grip strength is a non-zero value.

20. The power tool of claim 17, wherein the electronic processor is configured to control, in response to whether the power tool characteristic is greater than or equal to the selected one of the first threshold and the second threshold, the switching network to cease driving of the motor.

* * * * *